US012070776B2

(12) United States Patent
Egan, III et al.

(10) Patent No.: US 12,070,776 B2
(45) Date of Patent: Aug. 27, 2024

(54) ROTOR WITH FORWARD-SWEPT STRUTS FOR PRESSURE SCREEN CYLINDERS

(71) Applicant: Kadant Black Clawson LLC, Lebanon, OH (US)

(72) Inventors: John Joseph Egan, III, Centerville, OH (US); Cameron Coale Demler, Maineville, OH (US)

(73) Assignee: KADANT BLACK CLAWSON, LLC, Lebanon, OH (US)

( * ) Notice: Subject to any disclaimer, the term of this patent is extended or adjusted under 35 U.S.C. 154(b) by 0 days.

(21) Appl. No.: 18/137,084

(22) Filed: Apr. 20, 2023

(65) Prior Publication Data

US 2023/0338990 A1 Oct. 26, 2023

Related U.S. Application Data

(60) Provisional application No. 63/333,283, filed on Apr. 21, 2022.

(51) Int. Cl.

*B07B 1/52* (2006.01)
*B07B 1/20* (2006.01)
*D21D 5/02* (2006.01)

(52) U.S. Cl.

CPC ................ *B07B 1/528* (2013.01); *B07B 1/20* (2013.01); *D21D 5/026* (2013.01)

(58) Field of Classification Search

CPC . B07B 1/528; B07B 1/20; D21D 5/00; D21D 5/02; D21D 5/06; D21D 5/023; D21D 5/026; D21D 5/046; D21D 5/16

(Continued)

(56) References Cited

U.S. PATENT DOCUMENTS 3,970,548 A * 7/1976 Seifert ..................... D21D 5/06 209/240
4,166,028 A 8/1979 Weber
(Continued)

FOREIGN PATENT DOCUMENTS

CN 201817741 U * 5/2011
CN 205399068 U * 7/2016
(Continued)

OTHER PUBLICATIONS

International Search Report and Written Opinion dated Nov. 2, 2023, pertaining to Int'l Patent Application No. PCT/US2023/065983, 11 pgs.

(Continued)

*Primary Examiner* — Gene O Crawford
*Assistant Examiner* — Muhammad Awais
(74) *Attorney, Agent, or Firm* — DINSMORE & SHOHL LLP

(57) ABSTRACT

The present disclosure is directed to rotors for pressure screens with cylinders for screening solid contaminants from a solid slurry. The rotor includes a cylindrical hub, a plurality of foils spaced radially outward from the hub, and a plurality of struts coupling the plurality of foils to the hub. The struts include a forward edge having a forward-swept shape that creates streamlines that move contaminants and fibers from the general local flow field and those dislodged from the inner surface of the pressure screen cylinder radially inboard towards the hub. The streamlines produced by the forward-swept struts can reduce or prevent deposition of solid contaminants on the forward edge of the strut and on the leading edge of the foil. The struts can also include a release region proximate the inboard end of the strut.

20 Claims, 11 Drawing Sheets

(58) Field of Classification Search
USPC .................................................. 209/303, 306
See application file for complete search history.

(56) References Cited

U.S. PATENT DOCUMENTS

| | | | | |
|---|---|---|---|---|
| 5,071,543 | A | 12/1991 | Rajala | |
| 5,232,552 | A * | 8/1993 | Lundberg | D21D 5/026 210/415 |
| 5,611,434 | A | 3/1997 | Veh et al. | |
| 6,171,448 | B1 | 1/2001 | Iwashige | |
| 7,491,296 | B2 * | 2/2009 | Fredriksson | D21D 5/16 162/251 |
| 10,724,175 | B2 * | 7/2020 | Gscheider | D21D 5/026 |
| 2007/0114157 | A1 | 5/2007 | Fredriksson | |

FOREIGN PATENT DOCUMENTS

| | | | | |
|---|---|---|---|---|
| CN | 111501393 | A | 8/2020 | |
| CN | 113215848 | A * | 8/2021 | D21D 5/026 |
| CN | 111424458 | B * | 3/2022 | D21D 5/06 |
| DE | 102011085691 | A1 * | 5/2012 | D21C 5/02 |
| DE | 102011086205 | A1 * | 5/2012 | D21D 5/026 |
| EP | 0036328 | A2 * | 3/1981 | |
| EP | 0036328 | A2 | 9/1981 | |
| EP | 2816153 | A1 * | 12/2014 | D21D 5/026 |
| EP | 3690135 | A1 * | 8/2020 | D21D 5/02 |
| EP | 3690135 | A1 | 8/2020 | |
| WO | WO-02064884 | A1 * | 8/2002 | B01D 29/356 |

OTHER PUBLICATIONS

Chinese Office Action dated Mar. 7, 2024, pertaining to CN Patent Application No. 202380010250.0, 18 pgs.

* cited by examiner

ROTOR WITH FORWARD-SWEPT STRUTS FOR PRESSURE SCREEN CYLINDERS

CROSS-REFERENCE TO RELATED APPLICATION

The present application claims the benefit of priority to U.S. Provisional Patent Application No. 63/333,283 filed on Apr. 21, 2022, and entitled "Rotor with Forward-Swept Struts for Pressure Screen Cylinders," the entire contents of which are incorporated by reference herein.

BACKGROUND

Field

The present specification generally relates to screening devices for removing oversized solid contaminants from solid suspensions and, in particular, pressure screens with cylindrical filters having rotors with forward-swept struts.

Technical Background

In the paper industry, processes for making paper require production of pulp, which is a solid suspension of fibers, such as cellulose fibers or other fibers. Depending on the source of the fibers, the pulp can include various concentrations and sizes of solid contaminants such as wood fragments, fiber bundles, metal pieces, hardened adhesive, or other contaminants. For example, increasing use of recycled paper as a source of the fibers may increase the presence of hardened adhesives, metal fragments, and wood fragments in the pulp. These oversized solid contaminants can decrease the quality of the paper and/or cause disruptions in the flow of the pulp in the head box of a Fourdrinier machine or other paper-making processes.

Before introducing the pulp to the paper-making process, the pulp is often screened to remove these oversized solid contaminants from the pulp. Screening the pulp may also be used to sort the pulp with respect to fiber length or fiber stiffness. Pulp screening can be accomplished by introducing the pulp to a pressure screen, in which the acceptable portions of the pulp pass through holes or slots in the screen. The solid contaminants or unacceptable portions of the pulp (e.g., long or stiff fibers if screening based on properties of the fiber) do not pass through the slots or holes in the screen and are discharged from a rejects outlet of the pressure screen device. The pressure screen devices can also be used for removing oversized solid contaminants from slurries and solid suspensions in other industries other than the pulp and paper industry.

Pressure screen devices for screening paper pulp generally include a pressure screen cylinder and a rotor disposed within the pressure screen cylinder. The rotor has a plurality of foils, and rotation of the rotor traverses the plurality of foils circumferentially around the inner surface of the pressure screen cylinder. Movement of the foils along the inner surface of the pressure screen cylinder causes pressure pulses that remove contaminants and fibers matted to the inner surface of the pressure screen cylinder to prevent blockage of the screen by the solid contaminants and fibers.

SUMMARY

For conventional rotors for pressure screen cylinders, the rotor includes a hub and a plurality of foils, which are generally oriented in a direction parallel to the axis of rotation of the rotor. Each foil is coupled to the hub by a plurality of struts. The struts of conventional rotors extend radially outward to the foils. The rotor assembly rotates through the slurry fibers and contaminants that are naturally fed into the screening zone. Also, as the rotor is rotated and the movement of the foils dislodges contaminants and fibers from the inner surface of the pressure screen cylinder, the dislodged contaminants and fibers can collect on the forward edge of the struts at the outboard ends of the struts, where the struts are coupled to each of the foils. Fibers and contaminants caught on the forward edge of the struts can accumulate even more fibers and solids, and the deposits on the forward edge of the struts can continue to build up. The buildup of deposits of solid contaminants and fibers can even extend to the leading edge of the foils. This phenomenon is referred to as stringing and can increase rotor drag, which can increases the motor power needed to rotate the rotor. The contaminants and fibers built up on the forward edge of the struts proximate the foils and on the leading edge of the foils can also interfere with the flow under the foils negatively effecting the pressure pulses produced by the underside of the foils as they traverse around the inner surface of the pressure screen cylinder. This can reduce the effectiveness of the foils in dislodging contaminants and matted fibers from the inner surface of the pressure screen cylinder, which can reduce the capacity of the pressure screen cylinder.

Accordingly, an ongoing need exists for rotors for pressure screen cylinders that reduce stringing to maintain the effectiveness of the foils in removing contaminants and matted fibers from the inner surface of the pressure screen cylinder as well as reducing drag on the rotor. The pressure screen rotors of the present disclosure meet this need and solve these problems by incorporating forward-swept struts extending between the hub of the rotor and the foils. The forward-swept struts reduce the severity of the corner where the strut is coupled to the foils and the fluid dynamics created by the forward-swept struts create flow currents or flow fields that move fibers and contaminants, which are dislodged from the pressure screen cylinder or from the general local flow field, inboard towards the hub of the rotor instead of allowing the contaminants and fibers to collect on the forward edge of the strut proximate the foils and/or on the leading edge of the foils. The forward-swept struts can be made thinner compared to other alternative methods of reducing stringing, and the thinner struts of the forward-swept struts disclosed herein can reduce drag due to their reduced cross-sectional area. Since the flow currents created by the forward-swept struts convey the contaminants and fibers inboard, the forward-swept struts reduce the collection of contaminants and fibers on the more outboard parts of the forward edges of the struts and/or on the leading edges of the foils.

Additionally, the pressure cylinder rotors disclosed herein can have a release region disposed at or proximate to the points where the struts are connected to the hub portions of the rotor. The release region is a region of the struts proximate the inboard end of the struts that has a thickness greater than the thickness of the strut. The greater thickness of the release regions allow for the forward edge of the struts at the inboard end of the struts to have a greater radius of curvature so that contaminants and fibers do not get caught on the forward edge of the strut at the point where the strut is coupled to the hub. Instead, the contaminants and fibers slide over the forward edge of the strut and are returned to the fiber slurry. Additionally, any fibers moving inboard due along the forward edges of the struts due to the forward-swept shape of the forward edge encounter the local thickening at the release regions of the struts and slide off of the forward edges of the struts.

According to one or more aspects of the present disclosure, a rotor for a pressure screen with cylinder for screening contaminants from a solid slurry can include a cylindrical hub, a plurality of foils spaced radially outward from the hub, and a plurality of struts coupling the plurality of foils to the hub. Each of the plurality of struts is a forward-swept strut having a forward-swept edge.

According to one or more other aspects of the present disclosure, a pressure screening system for removing contaminants from a solid slurry or a suspension can include a pressure screen cylinder having a plurality of openings, the rotor of any of the aspects disclosed herein, and a drive motor operatively coupled to the rotor. The rotor can be disposed within the pressure screen cylinder, and the drive motor can be configured to rotate the rotor relative to the pressure screen cylinder.

According to yet another aspect of the present disclosure, a method for removing solid contaminants from a solid suspension or solid slurry can include contacting the solid suspension or solid slurry with a pressure screen cylinder comprising a cylindrical wall having an inner surface, an outer surface, and a plurality of openings extending through the cylindrical wall from the inner surface to the outer surface. Contact of the solid suspension with the screen cylinder can cause at least a portion of the solid suspension or solid slurry to pass through the plurality of openings. The method can further include rotating a rotor disposed within the pressure screen cylinder. The rotor can comprise a hub that is cylindrical, a plurality of foils spaced radially outward from the hub, and a plurality of struts coupling the plurality of foils to the hub. Each of the plurality of foils is radially spaced apart from the inner surface of the cylindrical wall, and each of the plurality of struts can be a forward-swept strut having a forward edge shaped so that an outboard end of the forward edge is disposed forward of at least 50% of other portions of the forward edge relative to a direction of rotation of the rotor. Rotation of the rotor can cause each of the plurality of foils to produce pressure pulses that dislodge solid contaminants and fibers matted to the inner surface of the pressure screen cylinder. The forward-swept struts can create flow currents and/or flow fields that move solid contaminants and fibers inboard and prevent solid contaminants and fibers from collecting on the forward edge of the struts and/or on the leading edge of the foils. The methods can further include collecting an acceptable solid suspension through the plurality of openings of the screen cylinder.

It is to be understood that both the foregoing general description and the following detailed description describe various embodiments and are intended to provide an overview or framework for understanding the nature and character of the claimed subject matter.

BRIEF DESCRIPTION OF THE DRAWINGS

The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
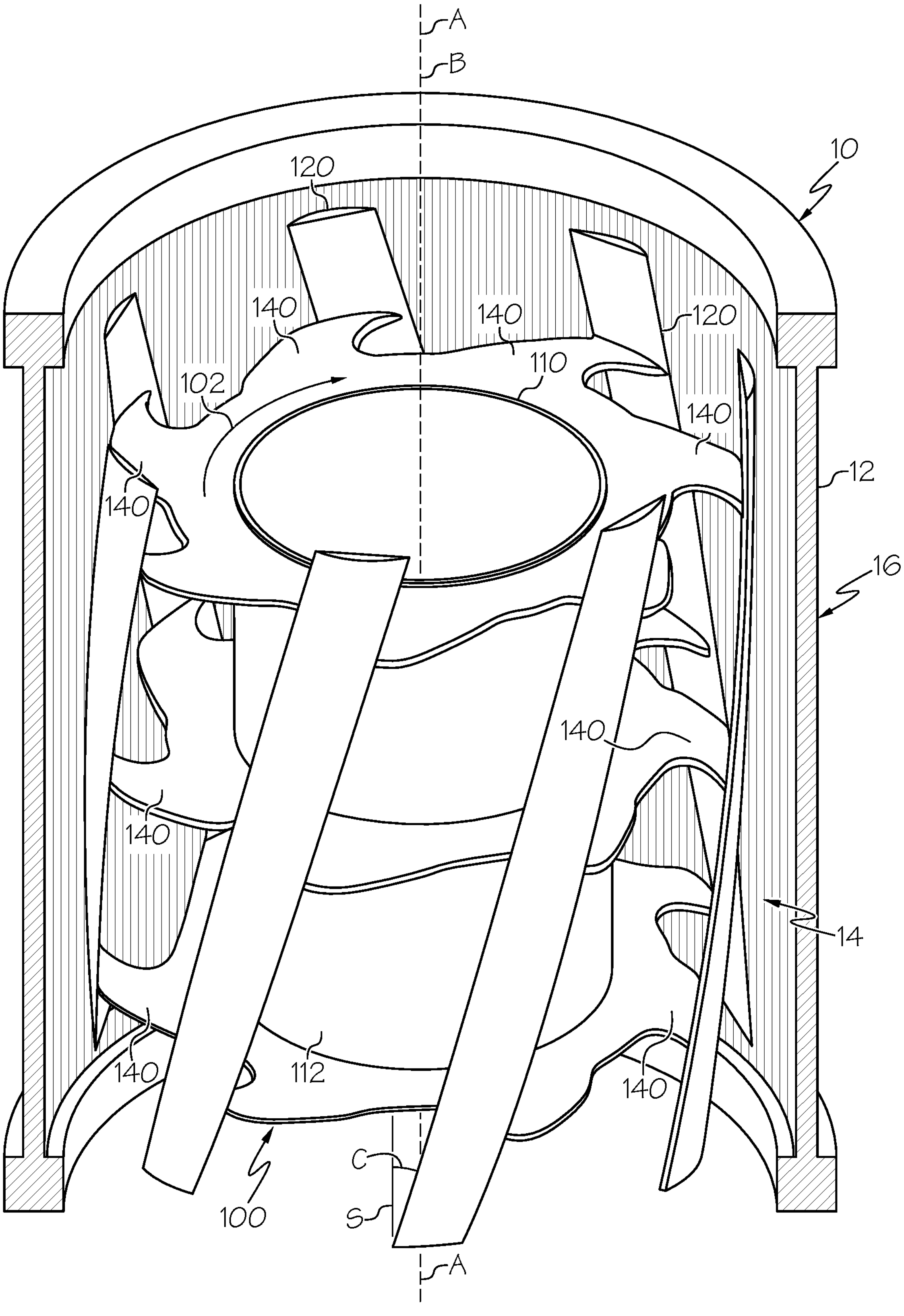
FIG. 1 schematically depicts a front perspective view of a pressure screen cylinder and a rotor disposed within the pressure screen cylinder, where the pressure screen cylinder is depicted in partial cross-section, according to one or more embodiments shown and described herein.

Reference will now be made in detail to embodiments of rotors for pressure screen cylinders, examples of which are illustrated in the accompanying drawings. Whenever possible, the same reference numerals will be used throughout the drawings to refer to the same or like parts.

Referring now to FIG. 1, one embodiment of a pressure screening device for removing solid contaminants from a solid suspension or slurry according to the present disclosure is illustrated. The pressure screening device comprises a pressure screen cylinder 10 and a rotor 100 disposed within the pressure screen cylinder 10. The rotor 100 comprises a hub 110 that is cylindrical, a plurality of foils 120 spaced radially outward from the hub 110, and a plurality of struts 140 coupling the plurality of foils 120 to the hub 110. Each of the struts 140 is a forward-swept strut having a forward edge 146. The forward edge 146 can be curved so that the outboard end 144 of the forward edge 146 of the strut is disposed forward of the greater part (e.g., greater than 50%) of the rest of the forward edge 146 of the strut 140 relative to the direction of rotation 102 of the rotor 100. As previously discussed, the forward-swept struts 140 disclosed herein can reduce stringing (e.g., buildup of contaminants and fibers at the outboard end 144 of the strut 140). Reducing stringing can reduce drag and the power required to rotate the rotor 100 as well as avoid stringing caused by reductions in the effectiveness of the foils 120 in creating pressure pulses against the inner surface 14 of the pressure screen cylinder 10 to dislodge contaminants and fibers.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Directional terms as used herein—for example up, down, right, left, front, back, top, bottom—are made only with reference to the figures as drawn and the coordinate axis provided therewith and are not intended to imply absolute orientation.

As used herein, the singular forms “a,” “an” and “the” include plural referents unless the context clearly dictates otherwise. Thus, for example, reference to “a” component includes aspects having two or more such components, unless the context clearly indicates otherwise.

As used herein, the terms “longitudinal” and “axial” refer to an orientation or direction generally parallel with the center axis A of the pressure screen cylinder and/or axis of rotation B of the rotor 100.

As used herein, the term “radial” refers to a direction along any radial line extending outward from the center axis A of the pressure screen cylinder (FIG. 1) and/or axis of rotation B of the rotor 100.

As used herein, the terms “upstream” and “downstream” refer to relative positions of features with respect to a direction of flow of the solid suspension or slurry. For the screen cylinders of the present disclosure, the flow of solid suspension is generally from the inside of the pressure screen cylinder, radially outward through the openings in the pressure screen cylinder, to the outer surface of the pressure screen cylinder.

As used herein, the terms “solid contaminant” or “oversized solid contaminant” refer to solid objects, such as wood chips, metal pieces, dried adhesives, strings, or other contaminants, that are not intended to be and not desired in the solid suspension or slurry and may be distinguished from the solid constituents that are intended to be in the solid suspension, such as fibers for example.

As used herein, the terms “forward” and “aft” refer to a location or position on an object relative to a direction of movement of that object, with “forward” being towards the direction of movement and “aft” being away from the direction of movement. The term “forward edge” of a strut disclosed herein refers to the edge of the strut facing toward the direction of rotation of the rotor and the term “aft edge” of the strut refers to the edge of the strut facing in a direction opposite from the direction of rotation of the strut.

As used herein, the term “inboard” refers to a radial direction towards the hub of the rotor and the term “outboard” refers to a direction radially outward away from the hub.

As used herein, the term “leading edge” refers to the edge of a foil of the rotor facing in the direction of rotation of the rotor. The term “trailing edge” refers to the edge of the foils of the rotor facing in a direction opposite from the direction of rotation of the rotor.

As used herein, the term “forward-swept” refers to a shape of the forward edge of the strut in which at least a portion of the outboard end of the forward edge of the strut is positioned forward relative to the direction of rotation of the rotor of other portions of the forward edge of the strut closer to the inboard end of the strut.

As used herein, the term “congruent” means coinciding exactly when superimposed.

In the pulp and paper industry, pulp screening can be accomplished by a pressure screening process using a screen cylinder. Pressure screening processes can include introducing the solid suspension, such as a solid suspension of fibers, to a pressure screen cylinder. The fibers can be any type of fiber, such as but not limited to cellulose fibers, cotton fibers, fiberglass fibers, or other fiber. The screen cylinder can be an outward flow screen cylinder, in which the acceptable portions of the solid suspension flow radially outward through the screen cylinder.

Referring now to FIG. 1, one embodiment of a pressure screen cylinder 10 comprising the rotor 100 of the present disclosure is schematically depicted. The pressure screen cylinder 10 comprises a cylindrical wall 12 having an inner surface 14 and an outer surface 16. The cylindrical wall 12 comprises a plurality of openings extending radially through the cylindrical wall 12 from the inner surface 14 to the outer surface 16. In embodiments, the cylindrical wall 12 may comprise a unitary cylindrical wall comprising a metal cylinder having holes or slots drilled or milled into the metal cylinder to provide the substantially radial openings through the cylindrical wall 12.

Figure 2:
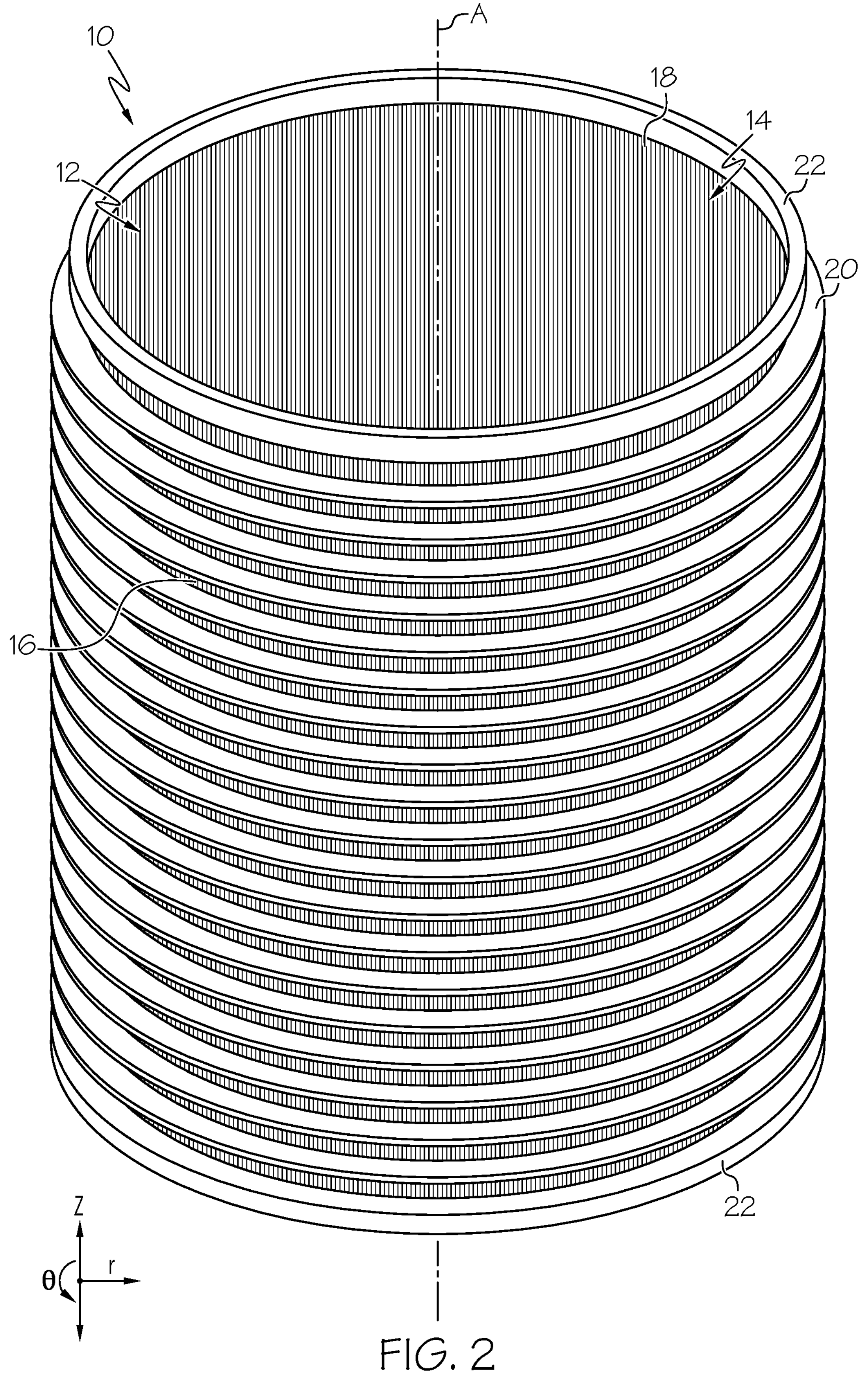
FIG. 2 schematically depicts a front perspective view of the pressure screen cylinder of FIG. 1, according to one or more embodiments shown and described herein.

Referring to FIG. 2, in embodiments, the cylindrical wall 12 of the pressure screen cylinder can include a plurality of longitudinally-arranged profiled bars 18, the profiled bars 18 defining a plurality of slots extending the length of the screen cylinder. In these embodiments, the profiled bars 18 can be coupled to at least one support ring 20 at attachment ends of the profiled bars 18. In embodiments, the pressure screen cylinder 10 can include a plurality of support rings 20. The pressure screen cylinder 10 can also include annular end flanges 22 at either axial end of the pressure screen cylinder 10. Each of the profiled bars 18 are longitudinally aligned with the center axis A of the pressure screen cylinder 10 (e.g., parallel to the center axis A of the pressure screen cylinder 10) and with each of the other profiled bars 18. The profiled bars 18 can be arranged side-by-side along a circular inner or outer circumference of the support rings 20 to form the cylindrical wall 12. The cylindrical wall 12 formed by the plurality of profiled bars 18 can include slots defined between each adjacent pair of profiled bars 18. The slots can extend the length of the pressure screen cylinder 10 between the two annular end flanges 22. Further features and aspects of the support structure and operation of the pressure screen cylinders 10 of the present disclosure may be found in U.S. Pat. No. 8,469,198, the entire contents of which are incorporated by reference herein. The pressure screen cylinder 10 is depicted in FIGS. 1 and 2 as an outward flow pressure screen cylinder, in which the acceptable solid suspension flows radially outward through the slots defined between the profiled bars 18. The pressure screen cylinder 10 may be operable to separate solid contaminants from the solid suspension. Other configurations for the pressure screen cylinder 10 are contemplated as long as the pressure screen cylinder 10 has a cylindrical wall 12 having an inner surface on which solid contaminants and oversized fibers collect in a mat during operation of the pressure screen cylinder 10.

Referring again to FIG. 1, the rotor 100 is disposed within the pressure screen cylinder 10. The rotor 100 comprises a hub 110, a plurality of foils 120 spaced radially outward from the hub 110, and a plurality of struts 140 coupling each of the plurality of foils 120 to the hub 110. The rotor 100 is operatively coupled to a rotor drive motor (not shown), which operates to rotate the rotor 100 within the pressure screen cylinder 10. The rotor 100 is rotated in a direction of rotation 102 relative to the pressure screen cylinder 10. The rotor 100 has an axis of rotation B. The axis of rotation B of the rotor 100 is generally congruent with the center axis A of the pressure screen cylinder.

Referring again to FIG. 1, the hub 110 can be a cylindrical hub centered on the axis of rotation B of the rotor 100. The hub 110 can be a solid shaft or a hollow cylindrical shaft. The hub 110 has a proximal end 114 operatively coupled to the rotor drive motor and a distal end 116 that extends into the pressure screen cylinder 10. The hub 110 can be operatively coupled to the rotor drive motor (not shown) to rotate the rotor 100 relative to the pressure screen cylinder 10. The hub 110 has an outer surface 112 that faces radially outward towards the inner surface 14 of the pressure screen cylinder 10.

Figure 3:
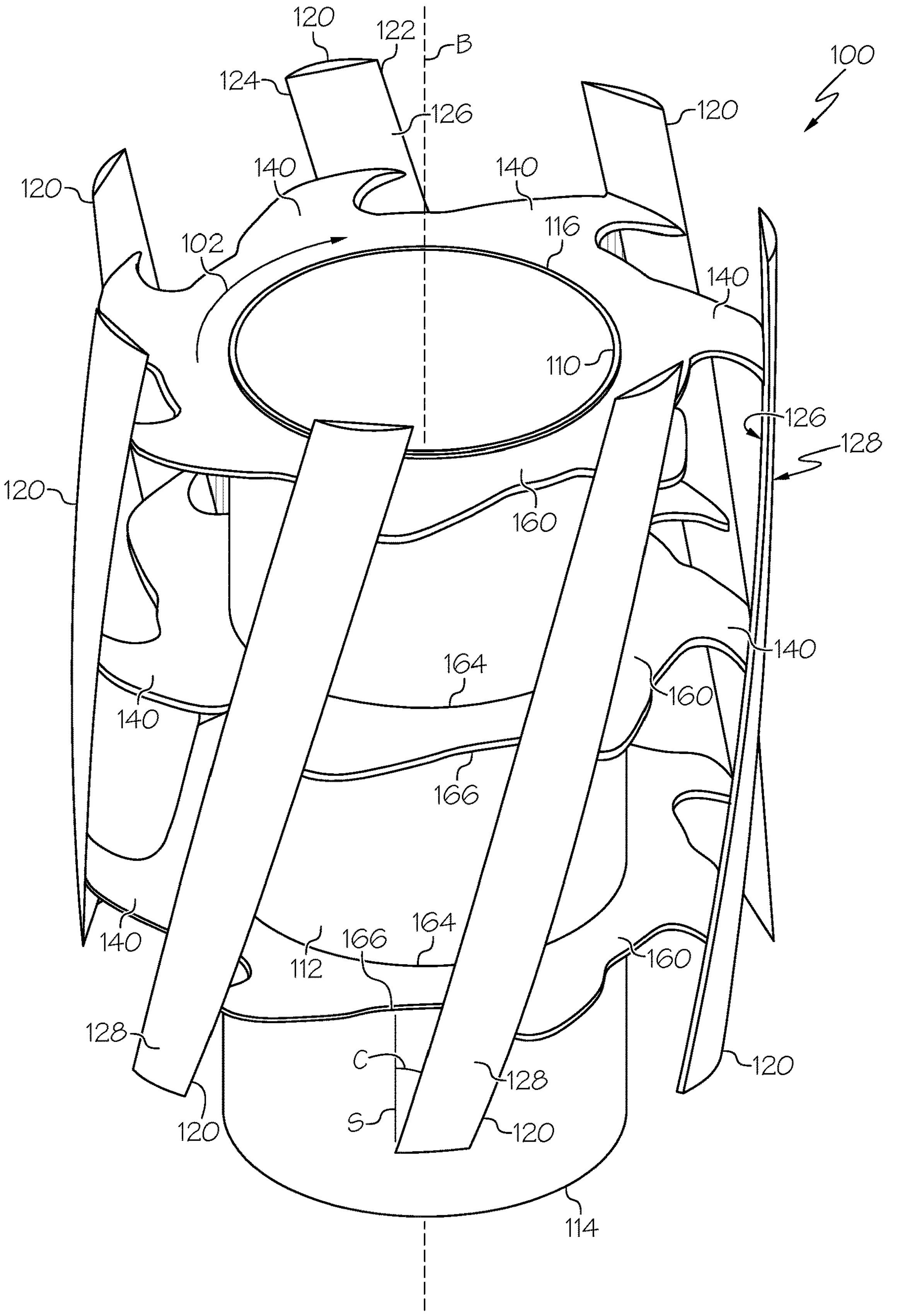
FIG. 3 schematically depicts a front perspective view of the rotor of FIG. 1, according to one or more embodiments shown and described herein.
Figure 4:
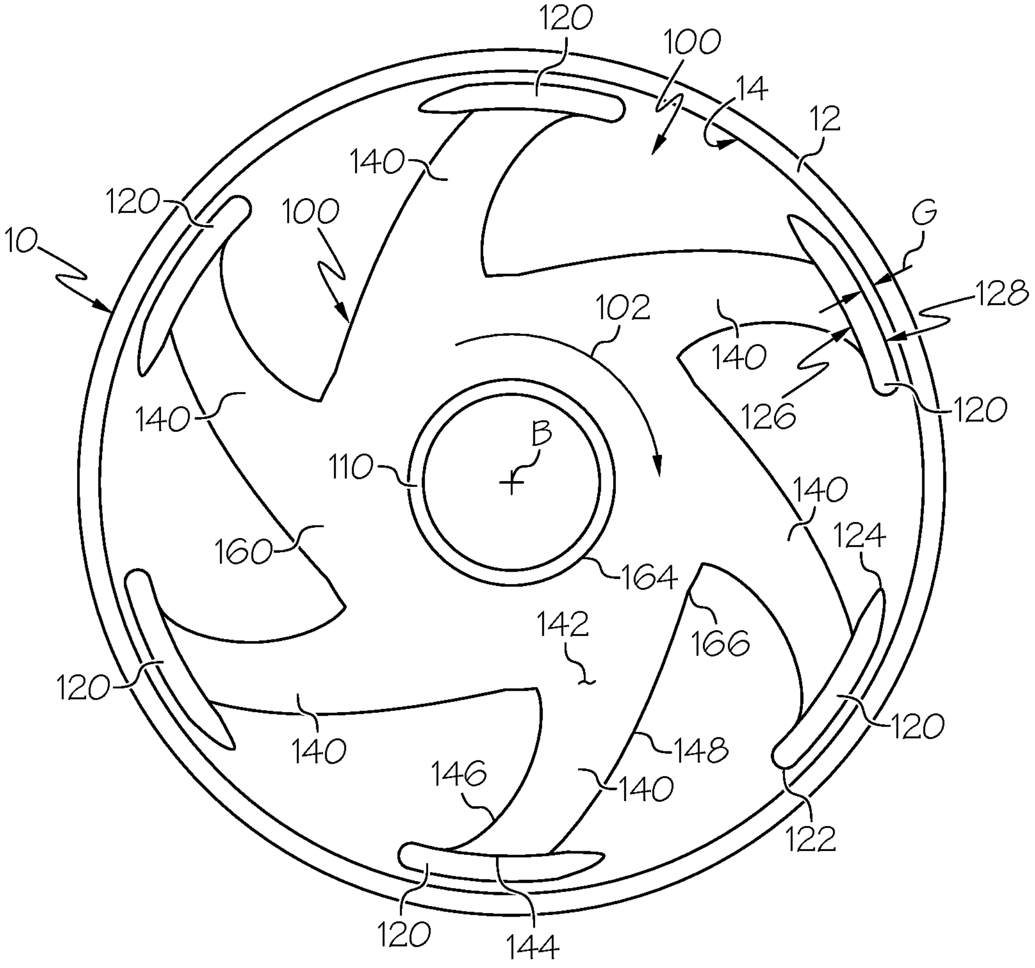
FIG. 4 schematically depicts top view of an embodiment of a rotor for a pressure screen cylinder, according to one or more embodiments shown and described herein.

Referring now to FIG. 3, the rotor 100 comprises the plurality of foils 120 that are spaced apart from the hub 110 in the radial direction so that the foils 120 travel along the inner surface 14 of the pressure screen cylinder 10 when the rotor 100 is rotated. In embodiments, each of the foils 120 can have an airfoil cross-sectional shape. Each of the foils 120 has a leading edge 122 facing in the direction of rotation 102 and a trailing edge 124 facing in a direction opposite from the leading edge 122 of the foil 120. In embodiments, each of the foils 120 can have a blunt or hemispherical leading edge 122 and a tapered trailing edge 124. However, it is understood that the leading edges 122 and trailing edges 124 of the foils 120 can have any shapes that are effective to create pressure pulses at the inner surface 14 of the pressure screen cylinder 10, and the scope of the present disclosure is not intended to be limited by the cross-sectional shape of the foils 120. Each of the foils 120 has an inner surface 126 facing radially inward towards the hub 110 and an outer surface 128 facing radially outward towards the inner surface 14 of the pressure screen cylinder 10. Referring now to FIG. 4, the foils 120 may be radially positioned so that a gap G between the outer surface 128 of the foils 120 and the inner surface 14 of the cylindrical wall 12 of the pressure screen cylinder 10 has a minimum distance of from about 1 mm to about 15 mm, such as from about 2 mm to about 10 mm. The gap G may be larger or smaller than the recited range without reduction in the effectiveness of the rotor designs discussed herein. The gap G defined between the outer surface 128 of the foils 120 and the inner surface 14 of the cylindrical wall 12 can be referred to as the screen working zone.

Referring again to FIG. 3, each of the foils 120 can be oriented generally vertically such that an acute angle C between the leading edge 122 of the foil 120 and a line S parallel to the axis of rotation B and intersecting the leading edge 122 of the foil 120 is less than or equal to about 40 degrees, less than or equal to about 30 degrees, or even less than or equal to about 20 degrees. In embodiments, the foils 120 may be angled such that the acute angle C is greater than 0 (zero) and less than or equal to 40 degrees. When the foils 120 are angled, each of the foils 120 may be slightly spiral in shape so that the gap G between the outer surface 128 of the foil 120 and the inner surface 14 of the pressure screen cylinder 10 is the same along the entire length of the foil 120. In embodiments, the foils 120 can be vertical such that the leading edges 122 of the foils 120 are parallel to the axis of rotation B of the rotor 100 (e.g., such that the angle theta is equal to 0 (zero)).

The rotor 100 can have a number of foils 120 that is sufficient to release matted solid contaminants and fibers from the inner surface 14 of the pressure screen cylinder 10 to keep the pressure screen cylinder 10 from becoming partially or completely blocked with the solid contaminants and fibers. The rotor 100 can have greater than or equal to 4 foils 120, such as 4, 5, 6, 7, 8, 9, or greater than 9 foils 120.

Referring again to FIGS. 3 and 4, each of the plurality of foils 120 is coupled to the hub 110 by a plurality of struts 140. As used herein, the term “strut” refers to a structure that couples a foil 120 to the hub 110 of the rotor 100 or couples a foil 120 to a hub portion of a strut ring, which is connected directly to the hub 110. A strut can include an arm, fin, bar, blade, rod, or other structure extending radially outward from the hub 110 or a hub portion 162 of a strut ring 160 to the foil 120. Each strut 140 is directly connected to the inner surface 126 of the foil 120 at an outboard end 144 of the strut 140 and coupled to the hub 110 at an inboard end 142 of the strut 140. In embodiments, the strut 140 can be directly connected to the outer surface 112 of the hub 110. In other embodiments, the rotor 100 can include a plurality of strut rings 160 that are directly connected to the outer surface 112 of the hub 110, and the struts 140 can extend radially outward from the strut ring 160 to the foils 120. The struts 140 couple the foils 120 to the hub 110 so that the foils 120 rotate with the hub 110 during operation of the pressure screen cylinder 10, while also allowing the slurry or solid suspension to flow axially through the center of the pressure screen cylinder 10 during operation. In embodiments, each foil 120 may be coupled to the hub 110 by at least 2, or at least 3 struts 140.

Referring again to FIG. 1, during operation of the pressure screen cylinder 10, a slurry is introduced axially to the interior volume of the pressure screen cylinder 10. The slurry can be a slurry comprising pulp fibers for paper-making dispersed in a liquid medium, such as water, although the pressure screen cylinder 10 and rotor 100 of the present disclosure are not intended to be limited thereto. The flow of the solid slurry or suspension into the pressure screen cylinder 10 causes liquid medium and fibers having a size less than a threshold size to pass through the openings in the cylindrical wall 12 of the pressure screen cylinder 10. Contaminants and fibers that are too large for the paper making process do not pass through the openings in the cylindrical wall 12 and collect on the inner surface 14 of the cylindrical wall 12 of the pressure screen cylinder 10. The collected solid contaminants and fibers can form a matt on the inner surface 14 of the cylindrical wall 12, which can reduce or prevent flow of acceptable slurry through openings in the cylindrical wall 12 of the pressure screen cylinder 10.

During operation, the rotor 100 is rotated within the pressure screen cylinder 10. Rotation of the rotor 100 traverses the plurality of foils 120 circumferentially around the inner surface 14 of the cylindrical wall 12 of the pressure screen cylinder 10. Movement of the foils 120 along the inner surface 14 of the pressure screen cylinder 10 generates pressure pulses in the screen working zone that act to remove the solid contaminants and fibers matted to the inner surface 14 of the pressure screen cylinder 10. Removal of the matted solid contaminants and fibers reduces or prevents blockage of the openings in the pressure screen cylinder 10 by the contaminants and reintroduces the solid contaminants and fibers back to the incoming slurry or solid suspension. The solid contaminants and rejected oversized fibers dislodged from the pressure screen cylinder 10 by the rotor foils 120 flow to a reject outlet of the pressure screen cylinder 10 and are removed from the system. Acceptable fibers released from the inner surface 14 go back into the incoming slurry or solid suspension and can be reintroduced to the pressure screen cylinder 10 for another opportunity to pass through the openings into the accepted outlet.

Figure 5:
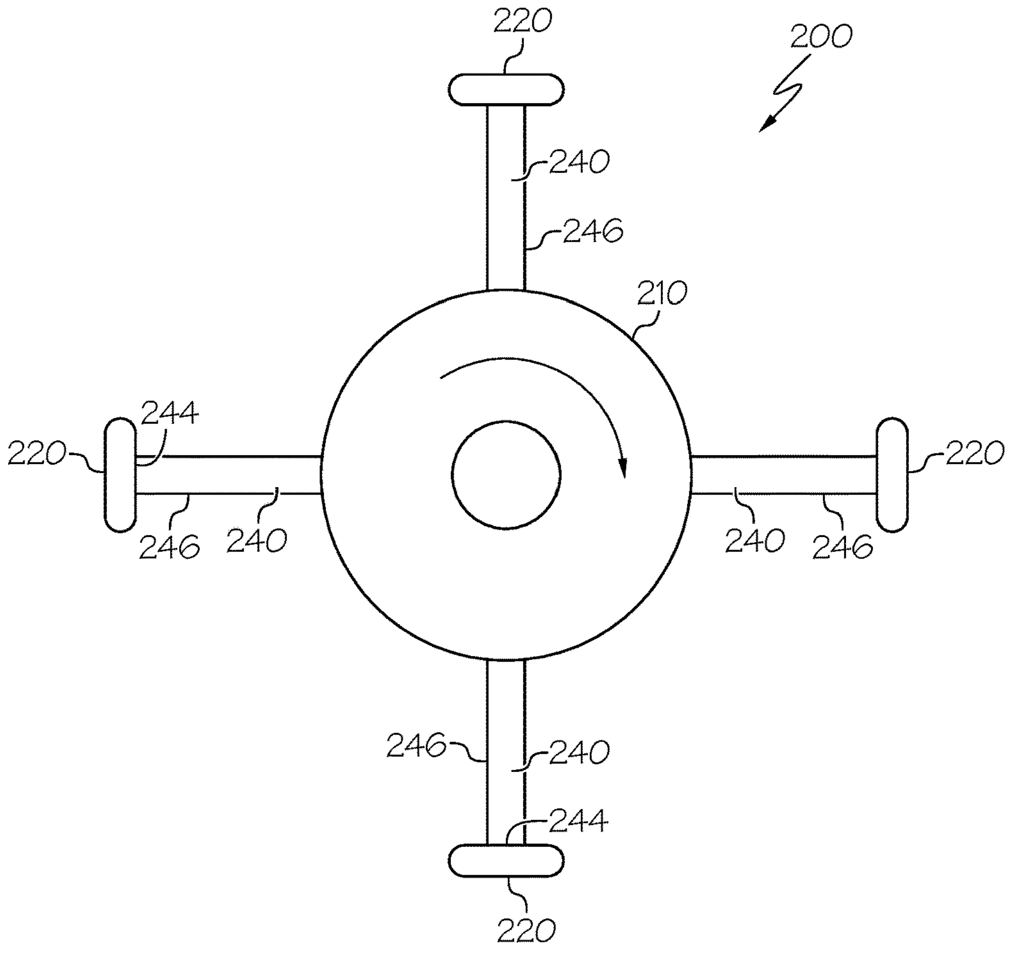
FIG. 5 (PRIOR ART)
FIG. 5 schematically depicts a top view of a conventional rotor of the prior art.

Referring now to FIG. 5, one example of a conventional rotor 200 for a pressure screen cylinder 10 is schematically depicted in top view. In the conventional rotor 200 of FIG. 5, the struts 240 coupling the foils 220 to the hub 210 are bars that extend radially outward along a straight line from the hub 210 to the foils 220. These struts 240 have a forward edge that lies along a straight line and forms a generally right angle with the foil 220 at the outboard end 244 of the strut 240.

Figure 6:
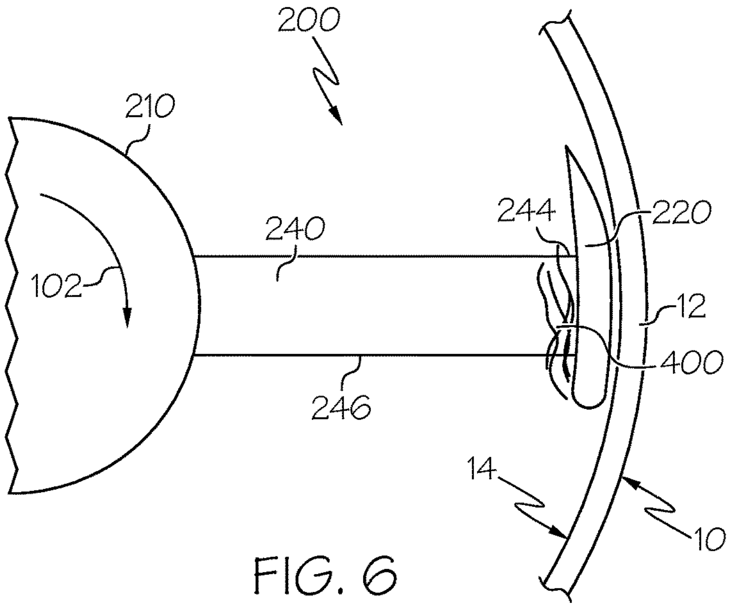
FIG. 6 (PRIOR ART)
FIG. 6 schematically depicts buildup of contaminants and fibers on a forward edge of a strut of the conventional rotor of FIG. 5.

During operation of the pressure screen cylinder and rotor, the rotor is rotated and the movement of the foils dislodges contaminants and fibers from the inner surface 14 of the pressure screen cylinder 10. Referring now to FIG. 6, the conventional rotor 200 of FIG. 5 is schematically depicted in top view. As shown in FIG. 6, the dislodged contaminants and fibers can collect on the forward edge 246 of the struts 240, in particular at the point where the struts 240 are coupled to each of the foils 220 (e.g., at the outboard end 244 of the strut 240). Fibers and contaminants initially caught on the forward edge 246 of the struts 240 can accumulate even more contaminants and fibers, and the deposits 400 on the forward edge 246 of the struts can continue to build up on the strut 240 and on the leading edge the foils 220. This phenomenon is referred to as stringing. The deposits 400 of solid contaminants and fibers resulting from stringing can increase rotor drag, which increases the motor power needed to rotate the rotor 200. The deposits 400 of contaminants and fibers built up on the forward edge 246 of the struts 240 proximate the foils 220 and on the leading edges of the foils 220 can also interfere with the pressure pulses produced by the leading edge of the foils 220 and can reduce the effectiveness of the foils 220 in dislodging contaminants and matted fibers from the inner surface 14 of the pressure screen cylinder 10.

The thickness of the struts 240 at the outboard end 244 can be increased to reduce the buildup of solid contaminants and fibers on the forward edge 246 of the struts 240. For instance, increasing the thickness of the struts 240 to greater than or equal to 1.5 inches (about 38 mm) so that a radius of curvature of the forward edge of the struts 240 is greater than or equal to about 0.75 inches (about 19 mm) can reduce the propensity of solid contaminants and fibers to get caught on the forward edge 246 of the struts 240 at the outboard ends 244. However, increasing the thickness of the struts 240 at the outboard ends 244 increases the drag caused by movement of the struts 240 through the slurry during operation. The increased drag on the struts 240 can greatly increase the power load needed to rotate the rotor 200.

Referring again to FIGS. 3 and 4, the rotors 100 of the present disclosure solve these problems by incorporating struts 140 that are forward-swept struts. The forward-swept design of the struts 140 disclosed herein produce flow fields around the forward edge 146 of the struts 140 that convey solid contaminants and fibers dislodged from the pressure screen cylinder 10 or from the general flow field around the strut 140 in the inboard direction (e.g., radially inward towards the hub 110). The forward-swept design of the struts 140 moving the solid contaminants and fibers inboard can reduce or prevent buildup of the contaminants and fibers on the forward edge 146 of the struts 140 and/or on the leading edge 122 of the foils 120. This, in turn, can reduce or prevent deposits of solid contaminants and fibers from interfering with the pressure pulses created by passage of the foils 120 over the inner surface 14 of the pressure screen cylinder 10 and can reduce the drag on the struts 140 caused by the buildup of contaminants and fibers on the outboard end 244 of the struts 140. The forward-swept design of the struts 140 disclosed herein can also enable the struts 140 to be made thinner, which can further reduce the drag caused by movement of the struts 140 through the solid slurry or suspension.

Referring again to FIGS. 3 and 4, as previously discussed, the rotor 100 includes the hub 110, the plurality of foils 120, and the plurality of struts 140 coupling the plurality of foils 120 to the hub 110. In embodiments, the rotor 100 can include a plurality of strut rings 160 coupled to the hub 110, where each strut ring 160 can comprise a hub portion 162 and each of the struts 140 can extend radially outward from the hub portion 162 of the strut rings 160 to the foils 120. The hub portion 162 may be an annular disc coupled to the hub 110 at a radially inner edge 164 and coupled to a plurality of struts 140 at a radially outer edge 166 of the annular disc. In some embodiments, the struts 140 can be coupled directly to the hub 110 at the inboard end 142 of the struts 140.

Figure 7:
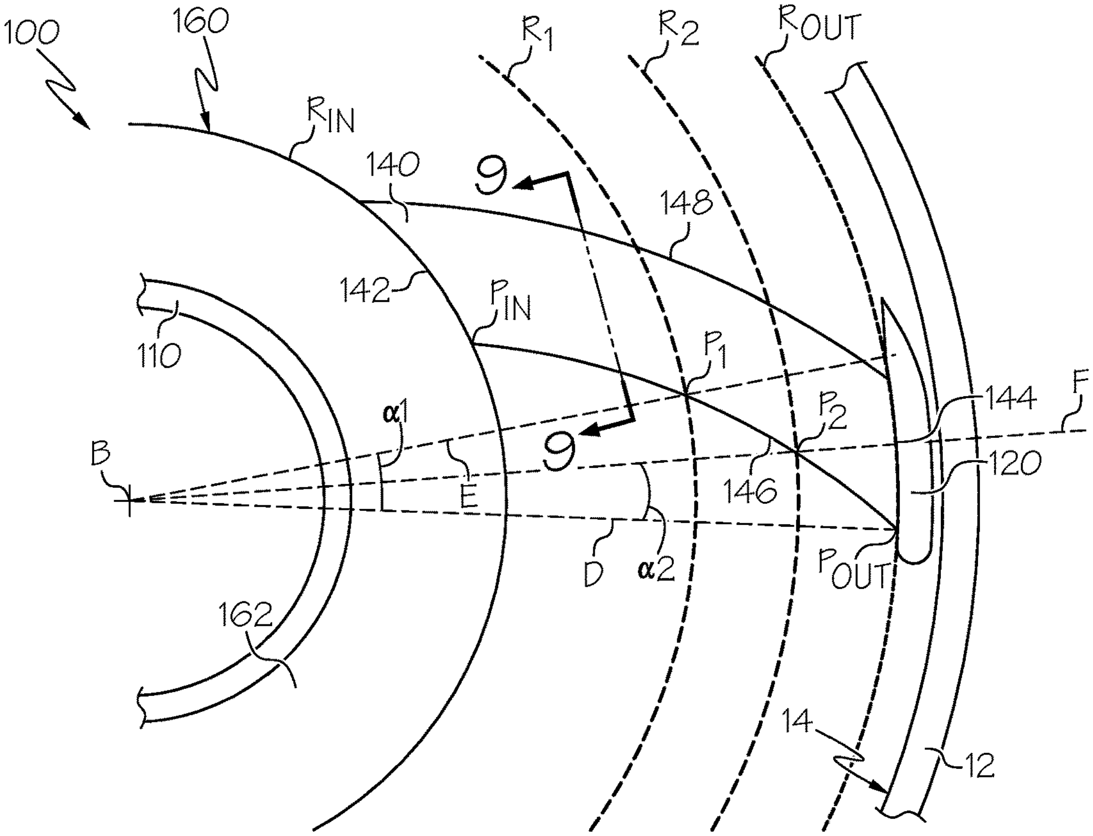
FIG. 7 schematically depicts a top view of a strut of the rotor of FIGS. 3 and 4, according to one or more embodiments shown and described herein.

Referring now to FIG. 7, the struts 140 disclosed herein have a forward edge 146 that has a forward-swept shape. The forward edge 146 having a forward-swept shape means generally that the forward edge 146 of the strut 140 is shaped so that the forward edge 146 at the outboard end 144 of the strut 140 is disposed forward of other portions of the forward edge 146 of the strut 140 relative to the direction of rotation 102 of the rotor 100. In embodiments, the forward edge 146 of the strut 140 is shaped so that the forward edge 146 at the outboard end 144 of the strut 140 is disposed forward of a majority of the other portions of the forward edge 146 of the strut 140 relative to the direction of rotation 102 of the rotor 100. The forward-swept shape of the forward edge 146 of the struts 140 is not intended to refer to any forward protrusion of material at or immediately proximate to (e.g., within less than 1 cm of) the outboard end 144 of the strut 140 that is merely incidental to coupling the strut 140 to the foil 120 or the hub 110.

The forward edge 146 of the strut 140 can be shaped so that the point $P_{OUT}$ on the forward edge 146 at the outboard end 144 of the strut 140 is disposed forward of a majority of the other portions of the forward edge 146 of the strut 140 relative to the direction of rotation 102 of the rotor 100. The forward edge 146 of the strut 140 can be shaped so that the point $P_{OUT}$ on the forward edge 146 at the outboard end 144 of the strut 140 is disposed forward of at least 50%, at least 75%, or even at least 90% of the other portions of the forward edge 146 of the strut 140 relative to the direction of rotation 102 of the rotor 100. The forward edge 146 of the strut 140 can be curved so that the point (e.g., point $P_{OUT}$) on the forward edge 146 at the outboard end 144 of the strut 140 is disposed forward of at least 50%, at least 75%, or even at least 90% of the other portions of the forward edge 146 of the strut 140 relative to the direction of rotation 102 of the rotor 100. In embodiments, the forward edge 146 of the strut 140 has a concave curvature. In embodiments, at least 25%, at least 35%, at least 50%, or even at least 90% of the forward edge 146 of the strut 140 has a concave curvature. In embodiments, the forward edge 146 of the strut 140 is curved continuously from the outboard end 144 to the inboard end 142. The curvature of the forward edge 146 here refers to the curvature in a horizontal plane, meaning that the curvature of the forward edge is in a plane perpendicular to the axis of rotation of the rotor and passing radially through the strut 140. In embodiments, a radius of curvature of the forward edge 146 can increase with decreasing radial distance between a point on the forward edge 146 of the strut 140 and the axis of rotation 102 of the rotor 100. Referring to FIG. 7, in embodiments, at least a portion of the forward edge 146 of the strut 140 can be straight (i.e., extend along a straight line instead of curved) and angled so that the outboard end 144 is forward of the inboard end 142 of the forward edge 146. In embodiments, at least 50%, at least 75%, at least 85%, at least 90%, at least 95%, or even at least 98% of the forward edge 146 of the strut 140 is straight (i.e., extends along a straight line instead of being curved).

Referring again to FIG. 7, a point $P_{IN}$ on the strut 140 is a point where the forward edge 146 of the strut 140 is attached to the hub 110 or to the hub portion 162 of a strut ring 160 at the inboard end 142 of the strut 140. Point $P_{OUT}$ is the point on the strut 140 where the forward edge 146 of the strut 140 is attached to the foil 120 at the outboard end 144 of the strut 140. Radius $R_{IN}$ is the radius of a circle centered on the axis of rotation B of the rotor 100 and passing through point $P_{IN}$ at the inboard end 142 of the forward edge 146 of the strut 140. Radius $R_{OUT}$ is the radius of a circle centered on the axis of rotation B of the rotor 100 and passing through point $P_{OUT}$ at the outboard end 144 of the forward edge 146 of the strut 140. Point P (e.g., point P1 or point P2) is a point on the forward edge of the strut 140 disposed between point $P_{IN}$ and point $P_{OUT}$. Radius R is the radius of a circle centered on the axis of rotation B of the rotor 100 and passing through point P on the forward edge 146 of the strut 140.

Referring to FIG. 7, a first point P1 is any point on the forward edge 146 of the strut 140 between points $P_{IN}$ and $P_{OUT}$, and radius R1 is the radius of a circle centered on the axis of rotation B of the rotor 100 and passing through point P1. A second point P2 is a different point on the forward edge 146 of the strut 140 between points $P_{IN}$ and $P_{OUT}$ and spaced apart from P1, and radius R2 is the radius of a circle centered on the axis of rotation B of the rotor 100 and passing through point P2. Radial line D passing through $P_{OUT}$ and radial line E passing through P1 define an angle $\alpha$1, and radial line D passing through $P_{OUT}$ and radial line F passing through P2 define an angle $\alpha$2. In embodiments, the forward edge 146 of the strut 140 can be considered to have a forward-swept shape when radius R2 is greater than radius R1 and angle $\alpha$2 is less than angle $\alpha$1. Angles $\alpha$1 and $\alpha$2 are measured as the angle moving counterclockwise in FIG. 7 from line D to line E or line F, respectively. In embodiments, the forward edge 146 of the strut 140 can be considered to have a forward-swept shape when radius R2 is greater than radius R1, angle $\alpha$2 is less than angle $\alpha$1, and point P2 is spaced apart from Pt by at least 5%, at least 10%, or at least 15% of the distance along the forward edge 146 between points $P_{IN}$ and $P_{OUT}$.

In embodiments, the point $P_{OUT}$ on the forward edge 146 of the strut 140 is disposed forward of point P relative to the direction of rotation 102 of the rotor 100, where point P is disposed on the forward edge 146 of the strut 140 at a point where radius R is greater than or equal to $(R_{IN}+((R_{OUT}-R_{IN})/2)$. In embodiments, the point $P_{OUT}$ on the forward edge 146 at the outboard end 144 of the strut 140 is disposed forward of point $P_{IN}$ at the inboard end 142 of the forward edge 146. In embodiments, point $P_{OUT}$ on the forward edge 146 at the outboard end 144 of the strut 140 is disposed forward of point P at all locations of point P on the forward edge 146 of the strut 140 between point $P_{IN}$ and point $P_{OUT}$.

Referring again to FIG. 7, in embodiments, when point P is at the intersection of the forward edge 146 and a circle having radius R equal to $(R_{IN}+((R_{OUT}-R_{IN})/2)$, point $P_{OUT}$ can be disposed forward of point P relative to the direction of rotation of the rotor 100 by greater than or equal to 5 degrees, greater than or equal to 10 degrees, greater than or equal to 15 degrees, or even greater than or equal to 20 degrees, such as from 5 degrees to 50 degrees. Stated in other words, the radial line D extending from the axis of rotation B and passing through point $P_{OUT}$ and the radial line E extending from the axis of rotation B and passing through point P1 form the angle $\alpha$l (alpha). In embodiments, when point P is at the intersection of the forward edge 146 and a circle having radius R equal to $(R_{IN}+((R_{OUT}-R_{IN})/2)$, point $P_{OUT}$ is forward of point P relative to the direction of rotation, and the angle $\alpha$1 can be greater than or equal to 3 degrees, greater than or equal to 5 degrees, greater than or equal to 10 degrees, greater than or equal to 15 degrees, or even greater than or equal to 20 degrees, such as from 3 degrees to 50 degrees. The forward edge 146 of the strut 140 can curve so that the angle $\alpha$ increases with decreasing radius R from point $P_{OUT}$ to at least the point P on the forward edge 146 of the strut 140 where radius R is equal to $(R_{IN}+((R_{OUT}-R_{IN})/2)$. In embodiments, the forward edge 146 of the strut 140 can be curved so that the angle $\alpha$ increases with decreasing radius R from point $P_{OUT}$ to the point $P_{IN}$. In embodiments, the forward edge 146 of the strut 140 is continuously curved from point $P_{OUT}$ to the point P on the forward edge 146 where the radius R of a circle centered on the axis of rotation B of the rotor 100 and passing through point P is less than or equal to $(R_{IN}+((R_{OUT}-R_{IN})/2)$.

Figure 8:
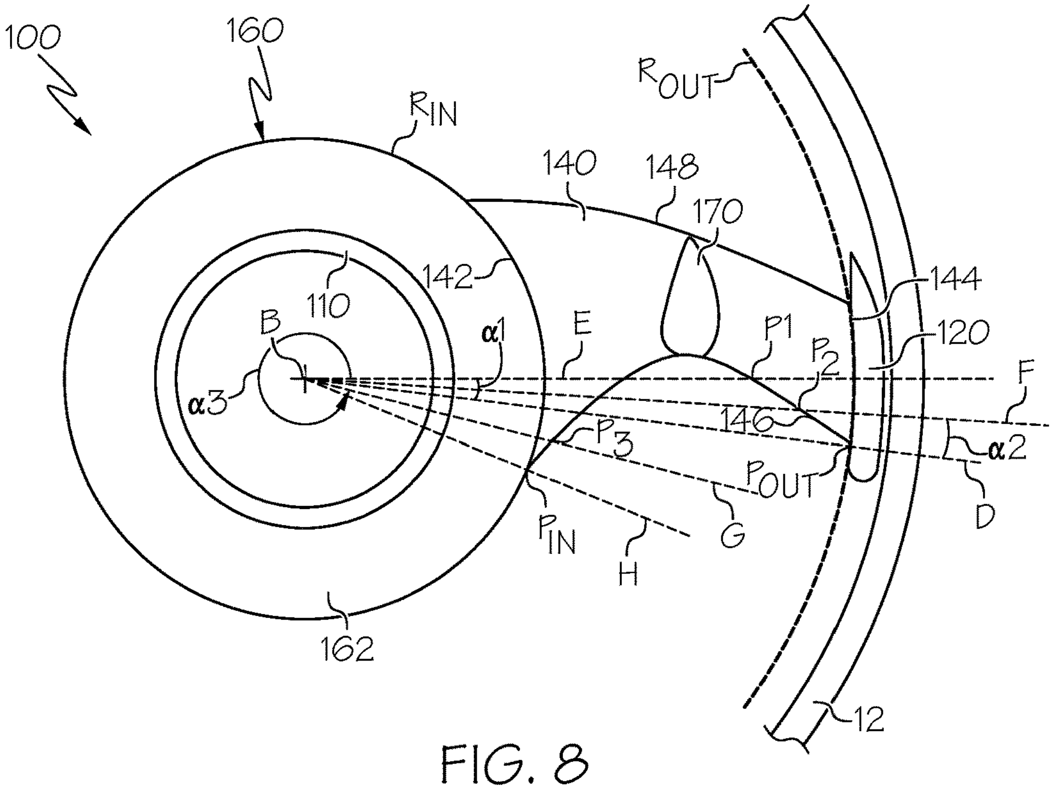
FIG. 8 schematically depicts a top view of another embodiment of a strut for a rotor, according to one or more embodiments shown and described herein FIG. 9A schematically depicts a cross-sectional view of the strut of FIG. 7 taken along reference line 9-9 in FIG. 7, according to one or more embodiments shown and described herein.
Figure 10:
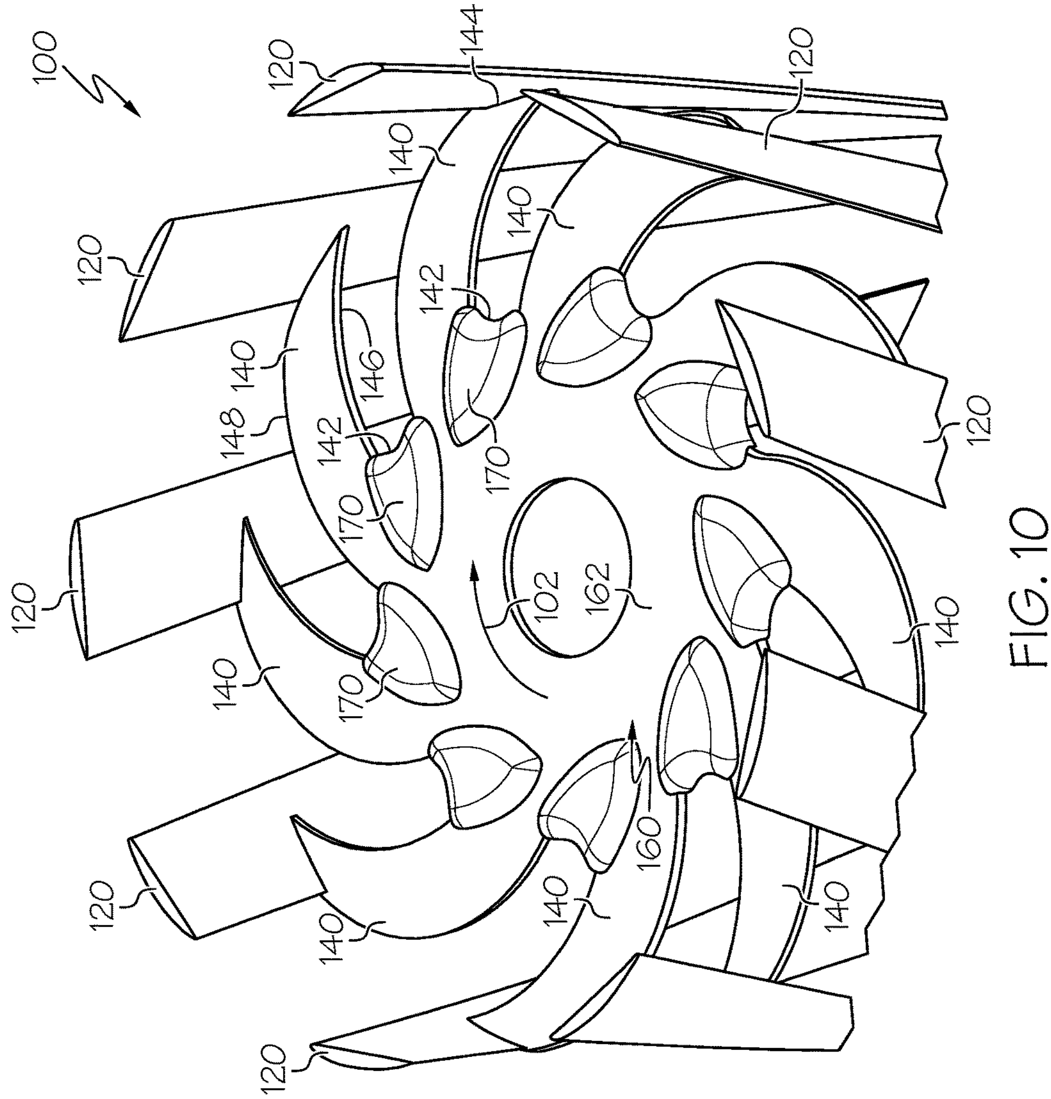
FIG. 10 schematically depicts a top perspective view of another embodiment of a rotor and a pressure screen cylinder, according to one or more embodiments shown and described herein.

Referring now to FIG. 8, in embodiments, the forward edge 146 of the strut 140 can be considered to have a forward-swept shape even though the forward edge 146 of the strut 140 curves back forward proximate to the inboard end 142 of the strut 140. In the embodiment schematically depicted in FIG. 8, point P3 is shown as disposed on the forward edge 146 of the strut 140 proximate to the inboard end 142. Points P3 and $P_{IN}$ are forward of points P1 and P2, as shown by the smaller radial distance from P3 to the axis of rotation B and the significantly greater angle $\alpha$3. Points P3 and $P_{IN}$ are also forward of $P_{OUT}$. However, the forward edge 146 of the strut 140 is still considered to be forward-swept because the P2 is forward of P1 and $P_{OUT}$ is forward of both P1 and P2. Thus, the forward edge 146 of the strut 140 has a forward-swept shape even if only the portions of the forward edge 146 nearest to the outboard end 144 of the strut 140 are angled or curved in the forward direction with increasing radial distance to axis of rotation B.

Figure 9A:
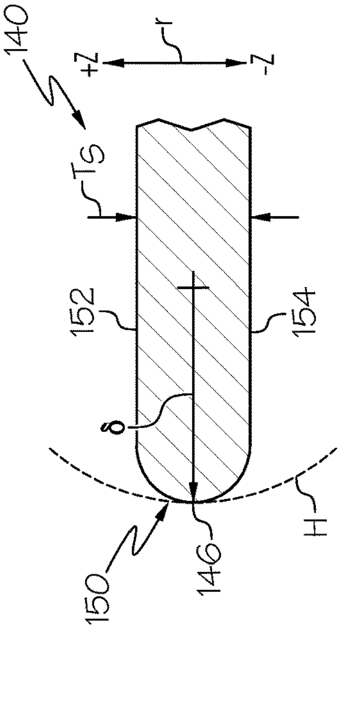
FIG. 9B schematically depicts a cross-sectional view of a strut having an asymmetrical front surface of the leading edge, according to one or more embodiment shown and described herein.

As previously discussed, the forward-swept shape of the struts 140 may reduce the propensity of contaminants and fibers for catching on the forward edge 146 of the strut 140, which may enable the thickness of the strut to be reduced. Referring now to FIG. 9A, a cross-section of one embodiment of the strut 140 taken along reference line 9-9 in FIG. 7 is schematically depicted. In embodiments, the struts 140 may have a thickness $T_S$ that is less than 1.5 inches (38 mm), such as from 0.25 inches (6.4 mm) to less than 1.5 inches (38 mm) or from 0.5 inches (12.7 mm) to 1.25 inches (about 32 mm). The forward-swept design of the struts 140 disclosed herein can provide greater flexibility in determining the thickness of the struts 140 to balance drag and stringing.

Figure 9B:
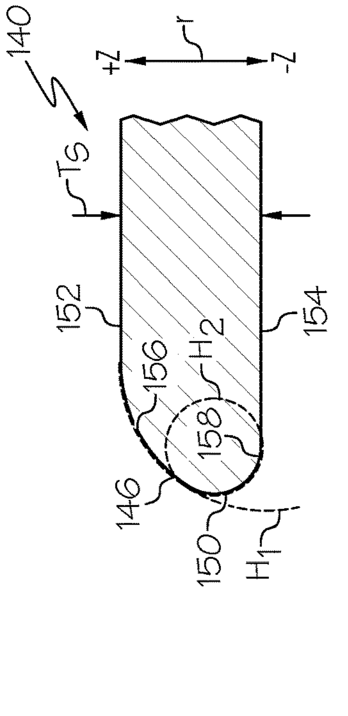
Figure 11:
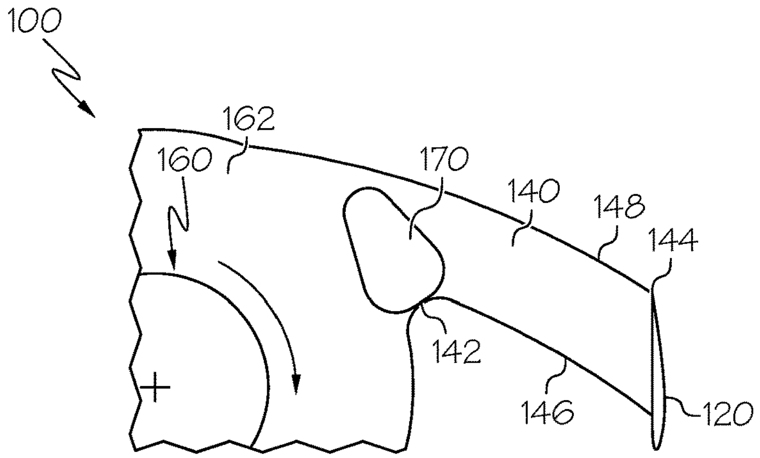
FIG. 11 schematically depicts a top view of a portion of the rotor of FIG. 10, according to one or more embodiments shown and described herein.
Figure 12:
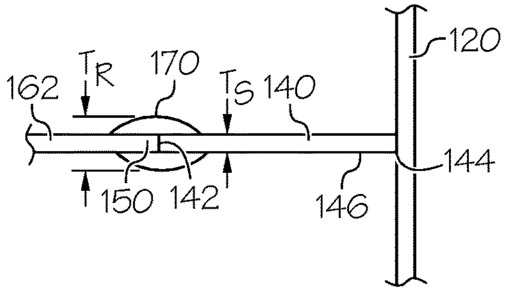
FIG. 12 schematically depicts a front view of the portion of the rotor in FIG. 11, according to one or more embodiments shown and described herein.
Figure 13:
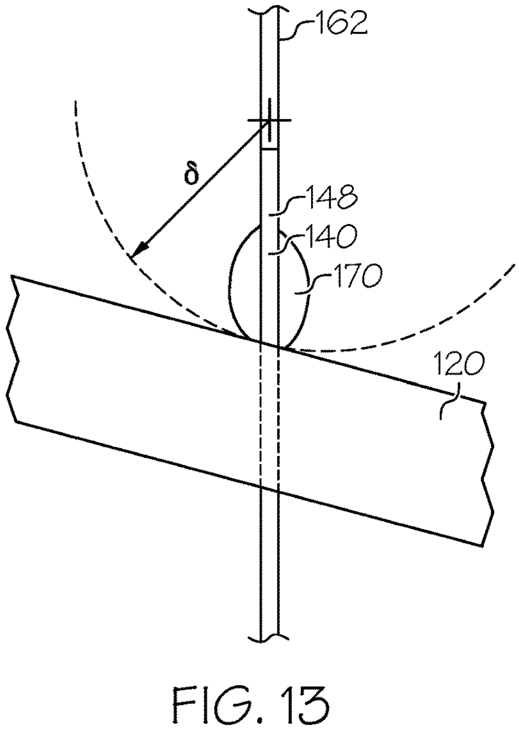
FIG. 13 schematically depicts a side view of the portion of the rotor in FIG. 11, according to one or more embodiments shown and described herein.

In embodiments, the forward edge 146 of the strut 140 comprises a front surface 150 extending from a top surface 152 of the strut 140 to a bottom surface 154 of the strut 140. The cross-section shape of the front surface 150 can be any shape, and the present disclosure is not intended to be limited by the cross-sectional shape of the front surface 150. The following embodiments described in FIGS. 9A and 9B are for purposes of illustration of the relationship between thickness, the radius of curvature of the front surface 150, and stringing. In embodiments, such as shown in FIG. 9A, the front surface 150 can have a hemispherical shape having a radius of curvature $\xi$ of less than about 0.75 inches (19 mm), less than or equal to 0.5 inches (12.7 mm), less than or equal to 0.4 inches (10.2 mm), less than or equal to 0.3 inches (7.6 mm), or even less than or equal to 0.25 inches (6.35 mm), such as from 0.1 inches to 0.75 inches. The radius of curvature $\xi$ of the front surface 150 refers to the radius of a circle H in a vertical plane (e.g., a plane parallel to the Z axis in FIG. 9A and bisecting the strut 140 vertically) having an arc that is congruent with the hemispherical contour of the front surface 150. The aft edge 148 is shown in FIG. 9A as having a tapered shape. However, it is understood that the aft edge 148 can have any suitable shape, including hemispherical shape or other shape. The contour of the aft edge 148 has no effect on stringing.

Referring now to FIG. 9B, in embodiments, the front surface 150 of the forward edge 146 of the struts 140 can have a non-hemispherical shape. In embodiments, the front surface 150 of the forward edge 146 can have an asymmetrical shape, such as but not limited to having two or more segments with different radii of curvature. The asymmetrical shape of the front surface 150 of the struts 140 can further aid in reducing buildup of solid contaminants and fibers from the forward edge 146 of the struts 140. For symmetrical shapes, such as a hemispherical shape, of the front surface 150, the forces on solid contaminants and fibers caught on the forward edge 146 are balanced, which can tend to keep the solid contaminants and fibers caught on the forward edge 146. In contrast, an asymmetrical shape to the front surface 150 can cause the forces acting on solid contaminants and fibers caught on the forward edge 146 to be imbalanced. In particular, an asymmetrical shape to the front surface 150 can change the flow path around the forward edge 146 of the strut 140 so that the velocity of fluids directed over the top surface 152 of the strut 140 is different from the velocity of fluids directed under the bottom surface 154 of the strut 140. The difference in fluid velocities above and below the strut 140 can cause the forces exerted on the solid contaminants and fibers due to fluid flow to be greater on one side of the strut 140, which can operate to pull the solid contaminants and fibers off the forward edge 146 of the strut 140.

Referring to FIG. 9B, the front surface 150 can have a first segment 156 and a second segment 158. The first segment 156 can have a first radius of curvature corresponding to the radius of circle H1 congruent with the first segment 156. The second segment 158 can have a second radius of curvature corresponding to the radius of circle H2 congruent with the second segment 158, where the second radius of curvature is different from the first radius of curvature. Other profile shapes of the front surface 150 of the forward edge 146 of the struts 140 are contemplated.

The forward-swept struts 140 create streamlines that convey materials inboard towards the hub 110. Thus, during operation, the forward-swept struts 140 cause the solid contaminants and fibers dislodged from the inner surface 14 of the pressure screen cylinder 10 or in the general flow field around the strut 140 to move inboard towards the inboard end 142 of the struts 140 and the hub 110 instead of collecting on the forward edge 146 of the struts 140 at the outboard end 144 or on the leading edge 122 of the foils 120. In embodiments, some solid contaminants and fibers may still get caught in the wedge shaped pocket at the point P1 where the inboard end 142 of the struts 140 are coupled to the hub 110 or to the hub portion 162 of the strut rings 160. Buildup of contaminants and fibers proximate to the inboard end 142 of the struts 140 is less problematic, because the buildup at the inboard end 142 of the struts 140 does not interfere with the operation of the foils 120 to create pressure pulses against the inner surface 14 of the pressure screen cylinder 10. Also, since the buildup is closer to the axis of rotation B of the rotor 100, the linear speeds of the inboard ends 142 of the struts 140 are less than the linear speeds of the outboard ends 144 of the struts 140. The reduced linear speed at the inboard end 142 reduces the influence of the deposits of contaminants and fibers on drag of the rotor 100. However, these deposits at the inboard end 142 of the struts 140 can still have some though more limited influence on drag and the power required for rotating the rotor 100.

Referring now to FIGS. 10-13, in embodiments, the rotors 100 disclosed herein can include a release region 170 positioned at the inboard end 142 of each of the struts 140 where the inboard end 142 is coupled to the hub 110 or to a hub portion 162 of the strut ring 160. The release region 170 can be disposed at the forward edge 146 of the strut 140 so that the release region 170 forms at least a portion of the forward edge 146 of the strut 140 at the region where the inboard end 142 of the strut 140 is coupled to the hub 110 or the hub portion 162 of the strut ring 160. The release region 170 may form less than 50%, less than or equal to 30%, less than or equal to 20%, less than or equal to 15%, less than or equal to 10%, or even less than or equal to 5% of the forward edge 146 of the strut 140, such as from 1% to 50% of the forward edge 146 of the strut 140.

The release region 170 may have a thickness $T_R$ greater than a thickness $T_S$ of the strut 140. The thickness $T_R$ of the release region 170 may be sufficient to increase the radius of curvature $\xi$ of the front surface 150 of the forward edge 146 of the strut 140, hub portion 162 of the strut ring 160, or both at the point at the inboard end 142 of the strut 140 is coupled to the hub 110 or the strut ring 160. In embodiments, the release region 170 can have a thickness $T_R$ such that a radius of curvature $\xi$ of the front surface 150 of the forward edge 146 of the strut 140 at the inboard end 142 is greater than or equal to 0.75 inches (19.1 mm), greater than or equal to 1.0 inches (25.4 mm), greater than or equal to 1.25 inches (31.8 mm), or even greater than or equal to 1.5 inches (38.1 mm), such as from about 0.75 inches to 6 inches.

The release region 170 has a thickness $T_R$ that is greater than the thickness $T_S$ of the strut 140. In embodiments, the thickness $T_R$ of the release region 170 can be at least 1.25 times, at least 1.5 times, at least 1.75 times, at least 2 times, at least 2.25 times, or even at least 3 times the thickness $T_S$ of the strut 140, such as from about 1.25 times to 10 times the thickness $T_S$ of the strut 140. In embodiments, the release region 170 can have a thickness $T_R$ of greater than or equal to about 35 mm, greater than about 37 mm, or even greater than or equal to about 40 mm. In embodiments, the thickness $T_S$ of the strut 140 can increase with decreasing radial distance to the axis of rotation B of the rotor 100 from a minimum thickness proximate the outboard end 144 of the strut 142 to the thickness $T_R$ of the release region 170 at the inboard end 142 of the strut 140. The thickness $T_R$ of the release region 170 can be at least 1.25 times, at least 1.5 times, at least 1.75 times, at least 2 times, at least 2.25 times, or even at least 3 times the minimum thickness of the strut 140 proximate the outboard end 144 of the strut 140.

The greater thickness of the release region 170 provides a greater radius of curvature $\xi$ of the strut 140 at the inboard end 142 of the strut 140. The greater radius of curvature $\xi$ of the release region 170 may cause contaminants and fibers passed along the forward edge 146 of the strut 140 in the radially inward direction from the outboard end 144 to the inboard end 142 to disengage from the inboard end 142 of the strut 140. The solid contaminants released from the struts 140 by the release region 170 can migrate towards the reject outlet of the pressure screen cylinder 10, where they can be removed from the pressure screening device. Any acceptable fibers released by the release region 170 can go back into the slurry or suspension for reintroduction to the pressure screen cylinder 10.

Referring again to FIG. 8, in embodiments, the forward edge 146 of the strut 140 may be forward swept proximate to the outboard end 144 of the strut 140 but may curve back in the forward direction proximate the inboard end 142 of the strut 140. In these embodiments, the release region 170 can be positioned at an inflection point of the forward edge 146. The inflection point is the point on the forward edge 146 where moving in the inboard direction or the outboard direction along the forward edge 146 results in moving forward from the inflection point relative to the direction of rotation of the rotor 100. The inflection point creates a pocket where solid contaminants and fibers can get caught on the forward edge 146 of the strut 140. Providing the release region 170 at the inflection point of the forward edge 146 can aid in releasing any fibers or contaminants flow inboard from the forward edge 146 of the strut 140.

As previously discussed herein, the pressure screen cylinders 10 that include the rotor 100 having forward-swept struts 140 can be used to process solid suspensions of cellulose or other fibers in the pulp and paper industry, as described herein. However, the pressure screen cylinder 10 and rotor 100 may not be limited to use in the pulp and paper industry. For example, pressure screen cylinders 10 and rotors 100 of the present disclosure having the forward-swept struts 140 may be used to screen solid suspensions and/or slurries to remove oversized solid contaminants in mining and drilling applications, food preparation and processing operations, water treatment processes, coating operations, and other industries.

Referring again to FIG. 1, in embodiments, a method of removing oversized solid contaminants from a slurry or solid suspension can include contacting the slurry or solid suspension with a pressure screen cylinder 10 comprising a rotor 100. The pressure screen cylinder 10 may have any of the features previously described herein for the pressure screen cylinder 10. In particular, the pressure screen cylinder 10 can comprise the cylindrical wall 12 having an inner surface 14, an outer surface 16, and a plurality of openings extending through the cylindrical wall 12 from the inner surface 14 to the outer surface 16. Contact of the solid suspension or solid slurry with the pressure screen cylinder 10 causes at least a portion of the solid suspension or solid slurry to pass through the openings in the cylindrical wall 12. The method may further include rotating the rotor 100 disposed within the pressure screen cylinder 10. The rotor 100 can have any of the features previously described herein for the rotor 100. In embodiments, the rotor 100 comprises the hub 110 that is cylindrical, the plurality of foils 120 spaced radially outward from the hub 110, and the plurality of struts 140 coupling the plurality of foils 120 to the hub 110. Each of the plurality of foils 120 is radially spaced apart from the inner surface 14 of the cylindrical wall 12. The struts 140 are forward-swept struts having a forward edge 146 that is curved so that an outboard end 144 of the forward edge 146 is disposed forward of the inboard end 142 of the forward edge 146 relative to a direction of rotation 102 of the rotor 100. Rotation of the rotor 100 causes each of the plurality of foils 120 to produce pressure pulse that dislodge solid contaminants and fibers matted to the inner surface 14 of the pressure screen cylinder 10. The forward-swept struts 140 create fluid flow streamlines that move solid contaminants and fibers inboard towards the hub 110 and prevents solid contaminants and fibers from collecting on the forward edge 146 of the struts 140, the leading edge 122 of the foils 120, or both. The method may further include collecting an acceptable solid suspension from the plurality of openings of the pressure screen cylinder 10. The method may further include collecting rejected solid contaminants from a reject outlet of the pressure screen cylinder.

EXAMPLES

Embodiments of the present disclosure will be further clarified by the following examples, which should not be construed as limiting on the disclosed and/or claimed embodiments presently described.

Example 1

Figure 14:
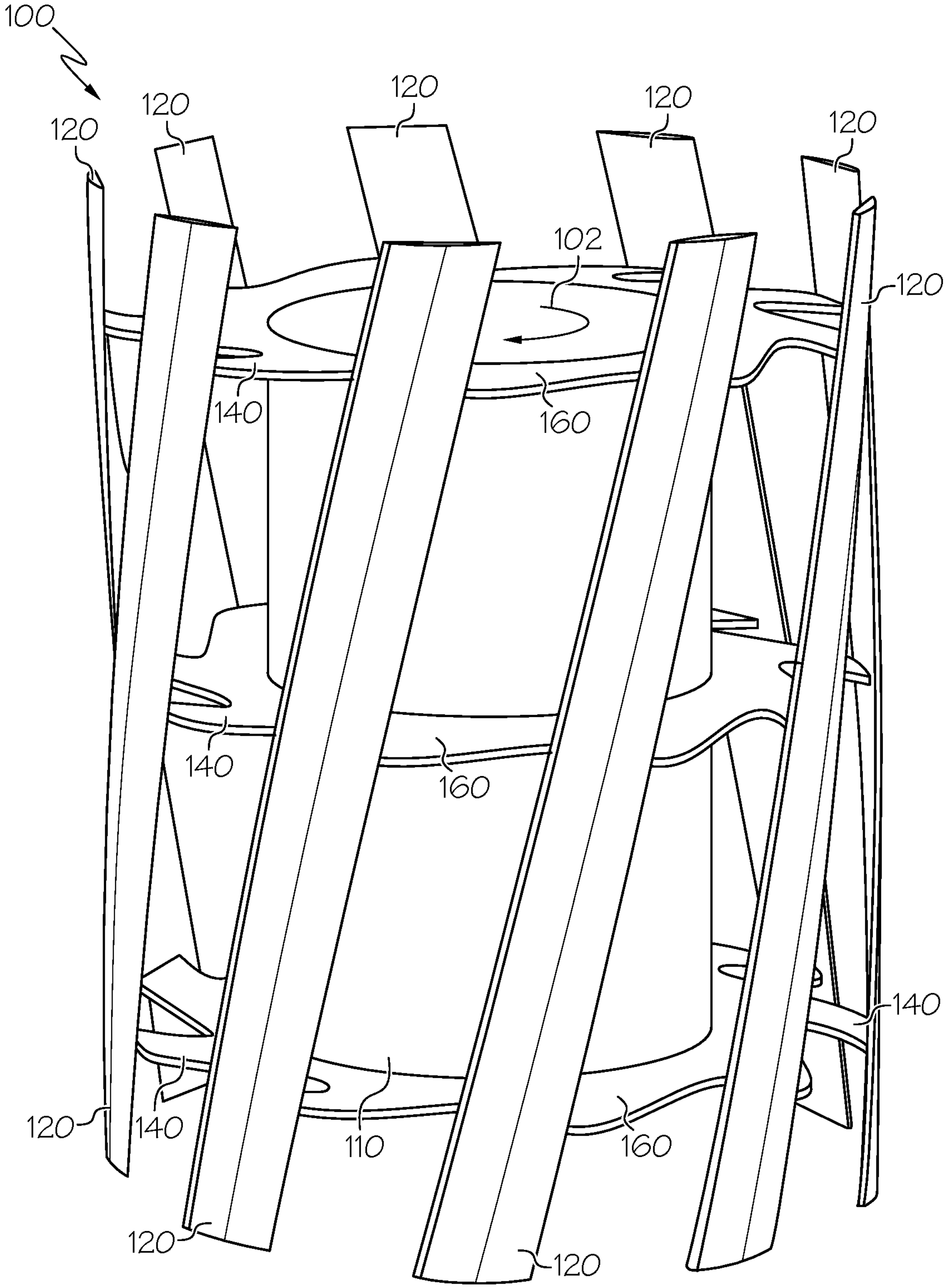
FIG. 14 schematically depicts a front perspective view of a rotor modeled in the Examples, according to one or more embodiments shown and described herein.
Figure 15:
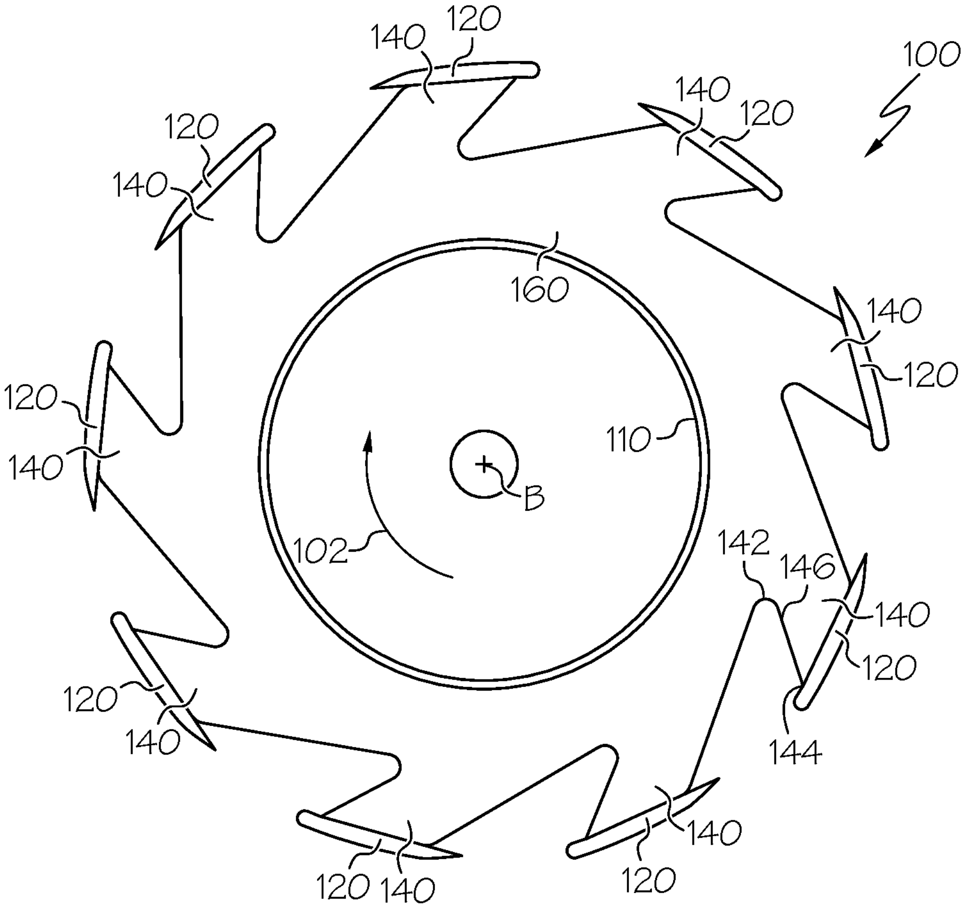
FIG. 15 schematically depicts a top view of the rotor in FIG. 14, according to one or more embodiments shown and described herein.
Figure 16:
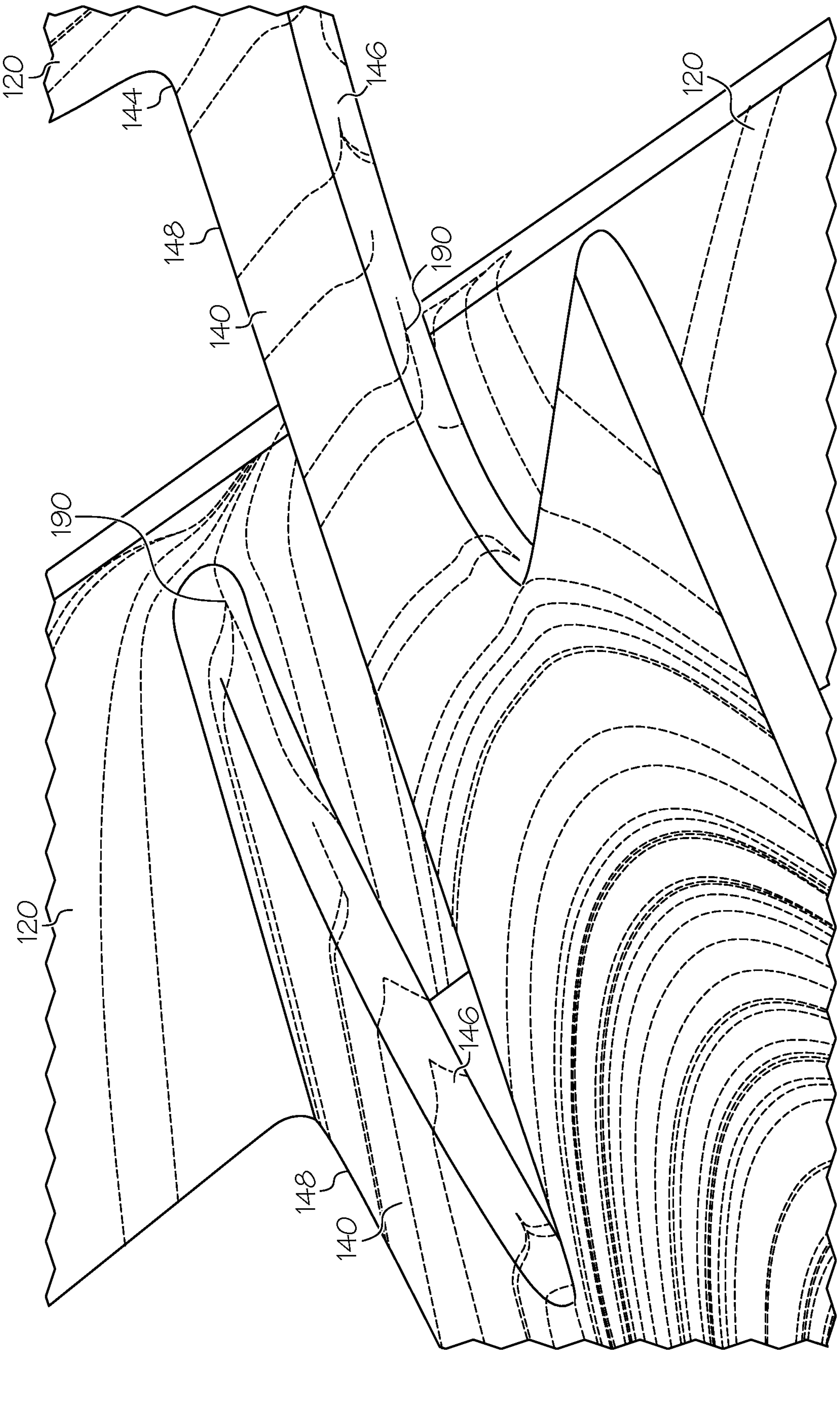
FIG. 16 graphically depicts modeling of flow streamlines near the rotor surfaces for a rotor having forward-swept struts, according to one or more embodiments shown and described herein.

In Example 1, rotation of a rotor having forward-swept struts within a fluid is modeled using Ansys R19.2 engineering simulation software. Referring now to FIGS. 14 and 15, the modeled rotor 100 is schematically depicted in side view (FIG. 14), and top view (FIG. 15). The modeled rotor 100 includes nine foils 120 oriented at an angle from vertical and slightly curved at the ends. Each foil 120 is attached to the hub 110 by three strut rings 160 having struts 140 extending radially outward from the strut ring 160 to the foil 120. The struts 140 are forward-swept such that the outboard end 144 of the forward edge 146 is forward relative to the rest of the forward edge 146 of the strut 140. The modeling of rotation of the modeled rotor 100 having the forward-swept struts 140 is graphically presented in FIG. 16. As shown in FIG. 16, rotation of the rotor 100 and movement of the forward-swept struts 140 through the liquid creates streamlines 190 along the forward edge 146 of the strut 140 that direct fluid and materials in an inboard direction, radially inward towards the hub 110.

Comparative Example 2: Pressure Screen Cylinder Operation with Standard Rotor In Comparative Example 2, a pressure screen cylinder having a standard rotor was operated to screen paper pulp.

The pressure screen cylinder had slots with a slot width of about 0.21 mm. The standard rotor of Comparative Example 2 had 6 foils, and each of the 6 foils were coupled to the hub by 3 struts extending radially between the hub and the inner surface of the foil. The struts were cylindrical rods extending radially between the hub and the inner surface of the foil, similar to the prior art depicted in FIG. 5. The struts comprising cylindrical rods had an outside diameter of about 30 mm. The pulp slurry introduced to the pressure screen cylinder of Comparative Example 2 had a nominal feed consistency of 2.8%.

The pressure screen cylinder and standard rotor were operated to screen the pulp slurry for an extended period of time. During operation, the rejects percentage, thickening factor, drive speed, and power consumption were recorded. The thickening factor was determined by measuring the consistency of reject slurry exiting from the reject outlet and the consistency of the feed slurry entering the screen. The thickening factor is the ratio of the consistency of the reject slurry to the ratio of the feed slurry. The average power consumption during operation is provided below in Table 1.

Following operation of the pressure screen cylinder, the pressure screen cylinder was stopped and the cylinder drained for inspection of the standard rotor. Upon inspection, the standard rotor was found to exhibit no stringing (i.e., build-up of paper fibers on the leading edge of the struts adjacent to the foils). Thus, the standard rotor comprising the cylindrical bar having an outer diameter of 30 mm had sufficient curvature to the leading edge to prevent stringing.

Example 3: Pressure Screen Cylinder Operation with Rotor Having Forward Swept Struts In Example 3, the standard rotor in the pressure screen cylinder of Comparative Example 2 was replaced by a rotor of the present disclosure having the forward swept struts. The pressure screen cylinder having the rotor of Example 3 with the forward swept struts was then operated to screen paper pulp. The rotor of Example 3 was similar to the rotor 100 depicted in FIG. 3. The rotor of Example 3 had 7 foils canted at an angle. Each of the foils were coupled to the hub by three forward swept struts having a thickness of 12 mm. The pulp slurry introduced to the pressure screen cylinder of Comparative Example 2 had a nominal feed consistency of 2.8%.

The pressure screen cylinder and the rotor of Example 3 with the forward swept struts were operated to screen the pulp slurry for an extended period of time. During operation, the production rate, rejects percentage, thickening factor, drive speed, and power consumption were recorded. The production rate was maintained the same as for Comparative Example 2. The rejects percentage and thickening factor for Example 3 were comparable to the values for Comparative Example 2. The average power consumption for Example 3 is provided below in Table 1. Following operation of the pressure screen cylinder, the pressure screen cylinder was stopped and the screen cylinder drained for inspection of the rotor of Example 3 for stringing. Upon inspection, the rotor of Example 3 having the forward swept struts was found to exhibit no stringing.

TABLE 1

| | Comparative Example 2 | Example 3 | Percent Improvement |
|---|---|---|---|
| Rotor Type | Standard | Forward swept | — |
| Number of Blades | 6 | 7 | — |
| Power | 77 | 59 | 23.4% |
| Stringing Observed | No | No | — |

Both the standard rotor of Comparative Example 2 and the rotor of Example 3 with the forward swept struts reduced stringing (e.g., buildup of fibers on the leading edge of the struts adjacent to the foils). The rotor of Example 3 had one additional foil. A person of ordinary skill in the art would expect the additional foil and additional 3 struts of the rotor of Example 3 to require more power. However, it was unexpectedly found that the average power required by the rotor of Example 3, even with the extra foil, was less than the power required to operate the standard rotor by more than 23%. Thus, the rotor of Example 3 comprising the forward swept struts eliminated the stringing issue while also providing operation at substantially less power compared to the standard rotor of Comparative Example 2.

While various embodiments of the rotor 100 for the pressure screen cylinder 10 and methods for using the rotor 100 and pressure screen cylinder 10 have been described herein, it should be understood that it is contemplated that each of these embodiments and techniques may be used separately or in conjunction with one or more embodiments and techniques. It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A rotor for a pressure screen cylinder for screening contaminants from a solid slurry or a solid suspension, the rotor comprising a cylindrical hub, a plurality of foils spaced radially outward from the cylindrical hub, and a plurality of struts, wherein each of the plurality of foils are coupled to the cylindrical hub by two or more of the plurality of struts and each of the plurality of struts is a forward-swept strut having a forward edge.

2. The rotor of claim 1, wherein for each of the plurality of struts, an outboard end of the forward edge of the strut is disposed forward of at least 50%, at least 75%, or even at least 90% of the forward edge of the strut relative to an axis of rotation of the rotor.

3. The rotor of claim 1, wherein, for each of the plurality of struts, an outboard end of the forward edge of the strut is disposed forward of an inboard end of the forward edge of the strut relative to an axis of rotation of the rotor.

4. The rotor of claim 1, wherein:

$P_{IN}$ is a point on the forward edge at an inboard end of each of the plurality of struts;

$P_{OUT}$ is a point on the forward edge at the outboard end of each of the plurality of struts;

$R_{IN}$ is a radial distance between an axis of rotation of the rotor and $P_{IN}$;

$R_{OUT}$ is a radial distance between an axis of rotation of the rotor and $P_{OUT}$;

P is a point on the forward edge between $P_{IN}$ and $P_{OUT}$;

R is a radius of a circle centered on the axis of rotation of the rotor and passing through P;

$P_{OUT}$ is disposed forward of P relative to a direction of rotation of the rotor when P is disposed at a position on the forward edge where R is greater than or equal to $(R_{IN}+((R_{OUT}-R_{IN})/2))$.

5. The rotor of claim 1, wherein a shape of the forward edge of each of the plurality of struts in a plane perpendicular to an axis of rotation of the rotor is straight.

6. The rotor of claim 1, wherein at least 50% of the forward edge of each strut has a shape in a plane perpendicular to an axis of rotation of the rotor is straight.

7. The rotor of claim 1, wherein a shape of the forward edge of each of the plurality of struts in a plane perpendicular to an axis of rotation of the rotor is curved.

8. The rotor of claim 7, wherein a radius of curvature of the forward edge of each of the plurality of struts increases with increasing radial distance from the axis of rotation of the rotor.

9. The rotor of claim 1, wherein a shape of the forward edge of each of the plurality of struts in a plane perpendicular to an axis of rotation of the rotor has a concave curvature.

10. The rotor of claim 9, wherein at least 25% of the forward edge of each of the plurality of struts has a concave curvature.

11. The rotor of claim 1, wherein a front surface of each of the plurality of struts has an asymmetric shape in a vertical plane.

12. The rotor of claim 1, further comprising release regions positioned at an inboard end of the plurality of struts, wherein each release region is disposed at the forward edge of each one of the plurality of struts so that the release region forms at least a portion of the forward edge of each strut.

13. The rotor of claim 12, wherein the release regions have a thickness measured in an axial direction that is greater than or equal to 1.25 times a thickness of each of the plurality of struts measured in an axial direction.

14. The rotor of claim 12, wherein a front surface of the forward edge of each of the struts at the release region has a radius of curvature of greater than or equal to 0.75 inches.

15. The rotor of claim 1, wherein an outboard end of each of the plurality of struts has a thickness less than or equal to 1.5 inches.

16. The rotor of claim 1, wherein each of the plurality of foils is helical and an acute angle between the leading edge of each foil and a line parallel to an axis of rotation of the rotor and intersecting the leading edge of the foil is greater than 0 degrees and less than or equal to 40 degrees.

17. A pressure screening system for removing contaminants from the solid slurry or the solid suspension, the pressure screening system comprising the pressure screen cylinder having a plurality of openings, the rotor of claim 1 disposed within the pressure screen cylinder, and a drive motor operatively coupled to the rotor, where the drive motor is configured to rotate the rotor relative to the pressure screen cylinder.

18. A method for removing solid contaminants from a solid suspension or solid slurry, the method comprising introducing the solid suspension or solid slurry to the pressure screening system of claim 17, rotating the rotor relative to the pressure screen cylinder, and collecting an acceptable solid suspension from the plurality of openings of the screen cylinder, wherein:

contact of the solid suspension or solid slurry with the pressure screen cylinder causes at least a portion of the solid suspension or solid slurry to pass through the plurality of openings;

rotation of the rotor causes the plurality of foils to produce pressure pulses that dislodge solid contaminants and fibers matted to an inner surface of the pressure screen cylinder; and the forward-swept struts create flow fields that move solid contaminants and fibers inboard and prevents solid contaminants and fibers from collecting on the forward edge of the plurality of struts and leading edges of the plurality of foils.

19. A method for removing solid contaminants from a solid suspension or solid slurry, the method comprising:

contacting the solid suspension or solid slurry with a pressure screen cylinder comprising a cylindrical wall having an inner surface, an outer surface, and a plurality of openings extending through the cylindrical wall from the inner surface to the outer surface, wherein contact of the solid suspension or solid slurry with the screen cylinder causes at least a portion of the solid suspension or solid slurry to pass through the plurality of openings;

rotating a rotor disposed within the pressure screen cylinder, wherein:

the rotor comprises a hub that is cylindrical, a plurality of foils spaced radially outward from the hub, and a plurality of struts coupling the plurality of foils to the hub;

each of the plurality of foils is radially spaced apart from the inner surface of the cylindrical wall;

each of the plurality of struts is a forward-swept strut having a forward edge rotation of the rotor causes the plurality of foils to produce pressure pulses that dislodge solid contaminants and fibers matted to the inner surface of the pressure screen cylinder; and the forward-swept struts create flow fields (visualized via streamlines) that move solid contaminants and fibers inboard and prevents solid contaminants and fibers from collecting on the forward edges of the plurality of struts and the leading edges of the plurality of foils; and collecting an acceptable solid suspension from the plurality of openings of the screen cylinder.

20. A rotor for a pressure screen cylinder for screening contaminants from a solid slurry or a solid suspension, the rotor comprising a cylindrical hub, a plurality of foils spaced radially outward from the cylindrical hub, and a plurality of struts coupling the plurality of foils to the cylindrical hub, wherein:

each of the plurality of struts is a forward-swept strut having a forward edge; and the rotor comprises release regions positioned at an inboard end of the plurality of struts, wherein each release region is disposed at the forward edge of each one of the plurality of struts so that the release region forms at least a portion of the forward edge of each strut.

* * * * *